United States Patent
Combs et al.

(10) Patent No.: US 10,654,659 B2
(45) Date of Patent: May 19, 2020

(54) CONVEYOR CONTROLLERS

(71) Applicant: Insight Automation Inc., Erlanger, KY (US)

(72) Inventors: Charles R. Combs, Burlington, KY (US); James P. Knapke, Fort Thomas, KY (US); Dimitar Ivanov Petrov, Sofia (BG); Timothy A. Barnes, Burlington, KY (US); David W. Sellers, Erlanger, KY (US)

(73) Assignee: Insight Automation, Inc., Erlanger, KY (US)

( * ) Notice: Subject to any disclaimer, the term of this patent is extended or adjusted under 35 U.S.C. 154(b) by 0 days.

(21) Appl. No.: 16/355,006

(22) Filed: Mar. 15, 2019

(65) Prior Publication Data
US 2019/0210814 A1 Jul. 11, 2019

Related U.S. Application Data

(63) Continuation of application No. 15/417,588, filed on Jan. 27, 2017, now Pat. No. 10,233,028, which is a
(Continued)

(51) Int. Cl.
| | | |
|---|---|---|
| *B65G 43/10* | (2006.01) | |
| *G05B 19/418* | (2006.01) | |
| *B65G 43/00* | (2006.01) | |
| *B65G 13/02* | (2006.01) | |
| *B65G 23/08* | (2006.01) | |
| *B65G 47/26* | (2006.01) | |

(52) U.S. Cl.
CPC ............ *B65G 43/10* (2013.01); *B65G 13/02* (2013.01); *B65G 23/08* (2013.01); *B65G 43/00* (2013.01);
(Continued)

(58) Field of Classification Search
CPC ...... G15B 9/414; B65G 47/261; B65G 43/10; B65G 13/00; G04B 19/414
(Continued)

(56) References Cited

U.S. PATENT DOCUMENTS 2,019,469 A 10/1935 Baruch
2,612,982 A 10/1952 Michaux, Jr.
(Continued)

FOREIGN PATENT DOCUMENTS

CA 2361973 A1 5/2003
DE 19802674 A1 9/1999
(Continued)

OTHER PUBLICATIONS

European Patent Office; Extended European Search Report in related European Patent Application No. 12782413.4 dated Jul. 13, 2015; 7 pages.
(Continued)

*Primary Examiner* — Gene O Crawford
*Assistant Examiner* — Lester III Rushin
(74) *Attorney, Agent, or Firm* — Wood Herron & Evans LLP

(57) ABSTRACT

A conveyor controller for being implemented into a conveyor system includes control circuitry and one or more network interfaces for coupling with other conveyor controllers. In one embodiment, the control circuitry configured for detecting whether another conveyor controller is connected and to determine which network interface is used in order to set the direction of the conveyor system. In another embodiment, the control circuitry is configured, to receive configuration data from a conveyor controller connected to a network interface, and to detect if another conveyor controller is and to transmit configuration message to another conveyor controller that includes additional configuration data associated with the conveyor controller. In still another embodiment, the control circuitry transmits configuration data to a replacement conveyor controller upon getting a request from the replacement conveyor controller that has been connected to a network interface.

20 Claims, 19 Drawing Sheets

Related U.S. Application Data continuation of application No. 14/270,590, filed on May 6, 2014, now Pat. No. 9,555,977, which is a continuation of application No. 13/103,705, filed on May 9, 2011, now Pat. No. 8,757,363.

(52) U.S. Cl.
CPC ........ *G05B 19/4189* (2013.01); *B65G 47/261* (2013.01); *G05B 2219/25081* (2013.01); *Y02P 90/18* (2015.11); *Y02P 90/28* (2015.11)

(58) Field of Classification Search
USPC .......... 198/575, 576, 579, 571, 572, 781.05, 198/785.1, 358, 577; 700/228, 230, 358
See application file for complete search history.

(56) References Cited

U.S. PATENT DOCUMENTS

| | | |
|---|---|---|
| 3,104,318 A | 9/1963 | Hill et al. |
| 4,962,844 A | 10/1990 | Francioni |
| 5,150,781 A | 9/1992 | Deisenroth et al. |
| 5,213,201 A | 5/1993 | Huber et al. |
| 5,228,558 A | 7/1993 | Hall |
| 5,285,887 A | 2/1994 | Hall |
| 5,456,347 A | 10/1995 | Best et al. |
| 5,582,286 A | 12/1996 | Kalm et al. |
| 5,862,907 A | 1/1999 | Taylor |
| 5,975,736 A | 11/1999 | Simmons et al. |
| 6,021,888 A | 2/2000 | Itoh et al. |
| 6,047,812 A | 4/2000 | Horn |
| 6,240,335 B1 | 5/2001 | Wehrung et al. |
| 6,253,906 B1 | 7/2001 | Hall |
| 6,253,909 B1 | 7/2001 | Kalm et al. |
| 6,256,544 B1 | 7/2001 | Weissinger |
| 6,302,266 B1 | 10/2001 | DeFrancisco et al. |
| 6,460,683 B1 | 10/2002 | Pfeiffer |
| 6,522,944 B2 | 2/2003 | Wielebski et al. |
| 6,701,214 B1 | 3/2004 | Wielebski et al. |
| 6,705,454 B2 | 3/2004 | Fishaw et al. |
| 6,731,094 B1 | 5/2004 | Itoh et al. |
| 6,758,327 B1 | 7/2004 | Stebnicki et al. |
| 6,820,736 B2 | 11/2004 | Itoh et al. |
| 6,827,202 B2 | 12/2004 | Topmiller et al. |
| 6,843,362 B2 | 1/2005 | Tachibana et al. |
| 6,847,862 B2 | 1/2005 | Hirako |
| 6,848,933 B1 | 2/2005 | Delaney, III et al. |
| 6,850,021 B1 | 2/2005 | Golownia et al. |
| 6,853,876 B2 | 2/2005 | Wehrung et al. |
| 6,873,882 B2 | 3/2005 | Tachibana et al. |
| 6,883,660 B2 | 4/2005 | Bigelow et al. |
| 6,898,483 B2 | 5/2005 | Wielebski et al. |
| 6,899,219 B2 | 5/2005 | Cotter et al. |
| 6,957,736 B2 | 10/2005 | Bonifer et al. |
| 6,959,804 B2 | 11/2005 | Helgerson et al. |
| 6,979,976 B2 | 12/2005 | Tachibana |
| 7,032,082 B1* | 4/2006 | Rahim ................... G06F 12/02 711/154 |
| 7,035,714 B2* | 4/2006 | Anderson ............. B65G 13/02 198/358 |
| 7,062,355 B2 | 6/2006 | Wielebski et al. |
| 7,096,287 B1 | 8/2006 | Champagne et al. |
| 7,104,395 B2 | 9/2006 | Brown et al. |
| 7,191,895 B2 | 3/2007 | Zeitler et al. |
| 7,275,637 B2 | 10/2007 | Brown |
| 7,280,889 B2 | 10/2007 | Knepple et al. |
| 7,360,638 B2 | 4/2008 | Ko et al. |
| 7,542,823 B2 | 6/2009 | Nagai |
| 7,613,542 B2 | 11/2009 | Ko et al. |
| 7,657,343 B2 | 2/2010 | Saito et al. |
| 7,665,598 B2 | 2/2010 | Begin et al. |
| 7,705,742 B1 | 4/2010 | Delaney, III et al. |
| 7,800,068 B2 | 9/2010 | Vugts et al. |
| 7,806,254 B2 | 10/2010 | Brayman et al. |
| 7,905,345 B2 | 3/2011 | Taylor |
| 8,006,829 B2 | 8/2011 | Itoh et al. |
| 8,028,817 B2 | 10/2011 | Itoh et al. |
| 8,050,795 B2 | 11/2011 | Dollens |
| 8,061,506 B2 | 11/2011 | Schafer |
| 8,100,254 B2 | 1/2012 | Balk |
| 8,284,993 B2 | 10/2012 | Taylor et al. |
| 8,322,515 B2 | 12/2012 | Rausch et al. |
| 8,342,313 B2 | 1/2013 | Wargo et al. |
| 8,371,435 B2 | 2/2013 | Agnoff |
| 8,757,363 B2 | 6/2014 | Combs et al. |
| 9,555,977 B2 | 1/2017 | Combs et al. |
| 2001/0020566 A1 | 9/2001 | Kalm et al. |
| 2001/0027909 A1 | 10/2001 | Itoh et al. |
| 2002/0084173 A1 | 7/2002 | Paquette |
| 2003/0144120 A1 | 7/2003 | Terranova |
| 2003/0209410 A1 | 11/2003 | Itoh et al. |
| 2004/0000744 A1 | 1/2004 | Grigg et al. |
| 2004/0007447 A1 | 1/2004 | Wielebski |
| 2004/0144623 A1 | 7/2004 | Newsom et al. |
| 2005/0192704 A1 | 9/2005 | Wielebski et al. |
| 2006/0030968 A1 | 2/2006 | Ko et al. |
| 2006/0127202 A1 | 6/2006 | Tryggvason |
| 2006/0155397 A1 | 7/2006 | Focke et al. |
| 2006/0289274 A1 | 12/2006 | Knepple et al. |
| 2007/0246071 A1 | 10/2007 | Streb |
| 2007/0261941 A1 | 11/2007 | Pelak et al. |
| 2008/0234858 A1 | 9/2008 | Dollens |
| 2009/0082904 A1 | 3/2009 | Swinderman et al. |
| 2009/0084657 A1* | 4/2009 | Brandt .................. B65G 37/02 198/575 |
| 2010/0012464 A1 | 1/2010 | Schiesser et al. |
| 2010/0076604 A1 | 3/2010 | Johnson et al. |
| 2010/0080672 A1 | 4/2010 | Bonora et al. |
| 2010/0100235 A1 | 4/2010 | Fatula, III |
| 2010/0101919 A1 | 4/2010 | Itoh et al. |
| 2011/0067977 A1 | 3/2011 | Neiser |
| 2011/0297509 A1 | 12/2011 | Taylor |
| 2012/0024669 A1 | 2/2012 | Danelski et al. |
| 2012/0048682 A1 | 3/2012 | Itoh et al. |
| 2012/0175225 A1 | 7/2012 | Breen et al. |
| 2012/0290126 A1 | 11/2012 | Combs et al. |
| 2014/0244030 A1 | 8/2014 | Combs et al. |
| 2017/0137230 A1 | 5/2017 | Combs et al. |

FOREIGN PATENT DOCUMENTS

| | | |
|---|---|---|
| EP | 0453241 A1 | 10/1991 |
| EP | 1749765 A1 | 2/2007 |
| JP | H03267835 A | 11/1991 |
| JP | H05193722 A | 8/1993 |
| JP | H06293426 A | 10/1994 |
| JP | H0977236 A | 3/1997 |
| JP | 10167446 | 6/1998 |
| JP | 2000117594 A | 4/2000 |
| JP | 2000302233 A | 10/2000 |
| JP | 2001269627 A | 10/2001 |
| JP | 2003164182 A | 6/2003 |
| JP | 2003192120 A | 7/2003 |
| JP | 2004288194 A | 10/2004 |
| JP | 2006033903 A | 2/2006 |
| JP | 2006044859 A | 2/2006 |
| JP | 2007078831 A | 3/2007 |
| JP | 2009300687 A | 12/2009 |
| WO | 0071445 A1 | 11/2000 |
| WO | 2006102691 A2 | 10/2006 |
| WO | 2008058543 A1 | 5/2008 |

OTHER PUBLICATIONS

U.S. Patent Office; Search Report and Written Opinion in related International Patent Application No. PCT/US12/36745 dated Jul. 18, 2017; 1 pages.

* cited by examiner

CONVEYOR CONTROLLERS

CROSS REFERENCE TO RELATED APPLICATIONS

This application is a continuation of U.S. patent application Ser. No. 15/417,588 filed Jan. 27, 2017 (pending), which is a continuation of U.S. patent application Ser. No. 14/270,590 filed May 6, 2014 (now U.S. Pat. No. 9,555,977), which is a continuation application of U.S. patent application Ser. No. 13/103,705 filed May 9, 2011 (now U.S. Pat. No. 8,757,363) the disclosures of which are incorporated by reference herein in their entireties.

FIELD OF THE INVENTION

The present invention relates controlling conveyor systems with networked conveyor controllers.

BACKGROUND OF THE INVENTION

Conveyors are used in a number of applications to convey an article from a first point to a second point. As an example, conventional conveyors can include roller conveyors, which include a plurality of motorized and non-motorized rollers, as well as belt conveyors, which include belts that are driven by one or more motorized rollers. Typically, one or more sections of the conventional conveyor are controlled by a controller, such as a computer. The controller generally controls the motorized rollers or motors that operate the belt of the conveyor to move an article along the conveyor. In conventional conveyor controllers, the controller also attempts to keep track of whether an article is being conveyed by monitoring sensors, such as photo-eyes, configured on the conveyor.

However, conventional controllers for conveyor systems often lack the capability for advanced control of feedback. For example, conventional controllers are able to determine whether an article is sensed by a photo-eye but unable to discern any additional information about that article. Moreover, conventional controllers are often unable to track differently sized articles as they move through various portions of the conveyor. This, in turn, can result in a jam situation or result in collisions between articles. In any event, information about the article itself is often unknown or indeterminable.

Moreover, conventional controllers are often difficult to maintain and replace. For example, a conveyor typically includes multiple controllers. But each controller of the conveyor must be programmed to work with the other controllers. Conventional programming of multiple controllers has often involved programming each individually then attempting to operate them together. But this conventional programming is time consuming and laborious, often involving dip-switch setting and complex algorithmic management to implement even a simple run of a conveyor (e.g., a "linear" conveyor without any diverts or mergers).

Also for example, some conventional controllers may require that each controller for a conveyor is reprogrammed if even one is replaced. Moreover, in the event that all conventional controllers need not be reprogrammed simply to replace one, conventional replacement of a controller often involves programming that replacement controller ahead of time. This can be a laborious process, as the exact configuration of a previous controller may not be available, requiring the configuration to be recreated from scratch.

Consequently, there is a continuing need for improving control of conveyors and the controllers that perform such control of conveyors.

SUMMARY OF THE INVENTION

Embodiments of the invention include various methods, apparatuses, and program products that are used to control at least a portion of a conveyor, determine information about an article conveyed by the conveyor, or otherwise operate a conveyor. In one embodiment, a method includes detecting whether a second conveyor controller is connected to the first conveyor controller and, in response to detecting that there is a second conveyor controller connected to the first conveyor controller, identifying whether the second conveyor controller is connected to a predetermined network interface of the first conveyor controller. The method further includes configuring the first conveyor controller to rotate a motorized roller in a first predetermined direction if a second conveyor controller is connected to the predetermined network interface and configuring the first conveyor controller to rotate the motorized roller in a second predetermined direction if a second conveyor controller is not connected to the predetermined network interface.

In another embodiment, a method includes, in response to receiving first configuration data from a first conveyor controller at a second conveyor controller, detecting whether a third conveyor controller is connected to the second conveyor controller. The method further includes, transmitting a configuration message to a third conveyor controller that includes second configuration data associated with the second conveyor controller if the third conveyor controller is connected to the second conveyor controller and determining that the second conveyor controller is a final conveyor controller of a linear conveyor if the third conveyor controller is not connected to the second conveyor controller.

In yet another embodiment, a method includes receiving and storing configuration data associated with a second conveyor controller connected to the first conveyor controller and, in response to a first request for data from a third conveyor controller intended to replace the second conveyor controller, transmitting the configuration data to the third conveyor controller.

In still a further embodiment, a method includes in response to user input to a first conveyor controller to automatically configure the first conveyor controller, requesting configuration data from a second conveyor controller connected to the first conveyor controller and, in response to receiving the configuration data, storing the configuration data in the first conveyor controller.

In another embodiment, a method includes monitoring a motorized roller for at least partial rotation thereof and, in response to detecting the at least partial rotation of the motorized roller, determining a length of time for the at least partial rotation. The method further includes, in response to determining that the length of time is greater than a target time, activating the motorized roller.

An additional embodiment includes a method that in turn includes, in response to a determination to prevent rotation of a motorized roller, identifying a rotational position associated with the motorized roller when the motorized roller is stopped and, in response to an external force on the motorized roller, applying a voltage signal to the motorized roller to maintain the roller at the identified rotational position.

Another embodiment includes a method that in turn includes detecting a photo-eye sensor connected to the conveyor controller, including whether the photo-eye sensor is light-operated or dark-operated, detecting a motorized roller connected to the conveyor controller, including information about the motorized roller, and automatically configuring at least one of a speed to operate the motorized roller, a rate at which to accelerate the motorized roller, a rate at which to decelerate the motorized roller, or combinations thereof.

In yet another additional embodiment, a method includes querying a motorized roller for data associated therewith, in response to receiving the data, analyzing the data to determine an operational characteristic associated with the motorized roller, and controlling the motorized roller based at least in part upon the determined operational characteristic.

A still further additional embodiment includes a method that in turn includes operating a motorized roller to rotate in a first direction corresponding to a direction of travel and, in response to detecting that a jam has occurred, operating the motorized roller to rotate in a second direction opposite the first direction.

Yet another embodiment is a method that includes sensing a current of a signal used to operate a motorized roller and determining a weight associated with the article based upon the sensed current. A still further embodiment is a method that includes determining a time during which a photo-eye detects an article as the article is conveyed along the at least a portion of the conveyor and determining a length associated with the article based upon the determined time.

Yet another embodiment is a method that includes determining a rate of rotation associated with a motorized roller, connecting a first voltage signal generated by the rotation of the motorized roller to a power supply of the conveyor controller to supply the power supply with energy generated by the motorized roller if the rotation of the motorized roller does not exceed a target speed, and supplying a second voltage signal to the motorized roller to reduce the rate of rotation thereof if the rotation of the motorized roller exceeds the target speed.

In another embodiment, a method includes determining whether a current through a motorized roller is associated with a low level to indicate that the motorized roller is conveying a first article, in response to determining that the motorized roller is conveying the first article, determining whether the current through the motorized roller is associated with a high level to indicate that the first article has encountered a second article, and, in response to determining that the first article has jammed or encountered a second article, conveying the first and second articles simultaneously and without substantial gap therebetween during such conveyance.

A still further embodiment is a method of controlling at least a portion of a conveyor with a conveyor controller in a conveyor system having at least one downstream conveyor controller and at least one upstream conveyor controller to the conveyor controller. The method includes sending a message to the downstream conveyor controller to request data to determine whether at least a portion of the conveyor controlled thereby is occupied by an article. If the at least a portion of the conveyor controlled by the downstream conveyor controller is not occupied by an article, the method includes operating a motorized roller to convey an incoming article at a target speed. However, if the at least a portion of the conveyor controlled by the downstream conveyor controller is occupied by an article, the method includes operating the motorized roller to convey an incoming article at an adjusted target speed that is slower than the target speed.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION

Figure 1:
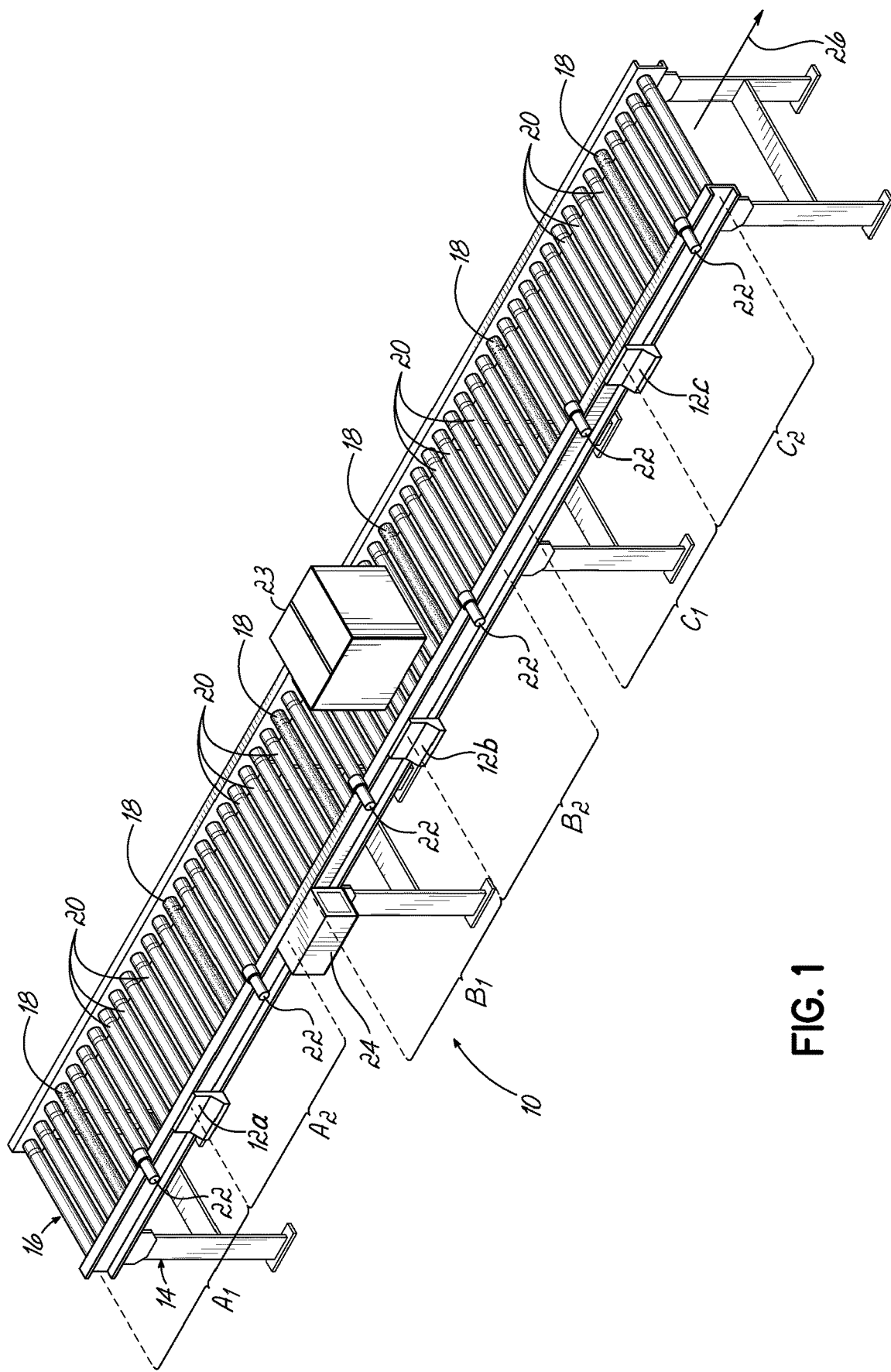
FIG. 1 is a perspective illustration of a portion of a conveyor system that uses one or more modular conveyor controllers consistent with embodiments of the invention.

FIG. 1 is a perspective illustration of a portion of a conveyor system 10 that uses one or more modular conveyor controllers 12a-c consistent with embodiments of the invention. In particular, the illustrated portion of the conveyor system 10 includes a conveyor assembly 14 which in turn includes a conveyor belt 16 that has motorized rollers 18 interspersed with non-motorized rollers 20. The conveyor assembly 14 further includes a plurality of sensors 22 and a power supply unit 24. The sensors 22 are configured to detect the presence or absence of an article 23 conveyed on the conveyor assembly 14, while the power supply unit 24 is configured to provide power to one or more modular conveyor controllers 12, the motorized rollers 18, and/or the sensors 22.

As illustrated in FIG. 1, each modular conveyor controller 12 (referred to hereinafter as "controller" 12) interfaces with and/or controls up to two motorized rollers 18 and up to two sensors 22. As such, each controller 12 may be configured to control one or more respective "zones" of the conveyor assembly 14 (e.g., a respective area of the conveyor assembly 14). Each zone, in turn, may include one or more motorized rollers 18 and one or more sensors 22. As illustrated in FIG. 1, each controller 12a-c is configured to control two zones. More specifically, controller 12a is configured to control zones A1 and A2, controller 12b is configured to control zones B1 and B2, and controller 12c is configured to control zones C1 and C2. In some embodiments, each sensor 22 may be an optical sensor, such as an IR sensor that is configured to detect the presence of an article 23 on the conveyor assembly 14. In operation, one or more controllers 12 are configured to move an article 23 in a downstream direction 26 along the conveyor system 10.

Figure 2:
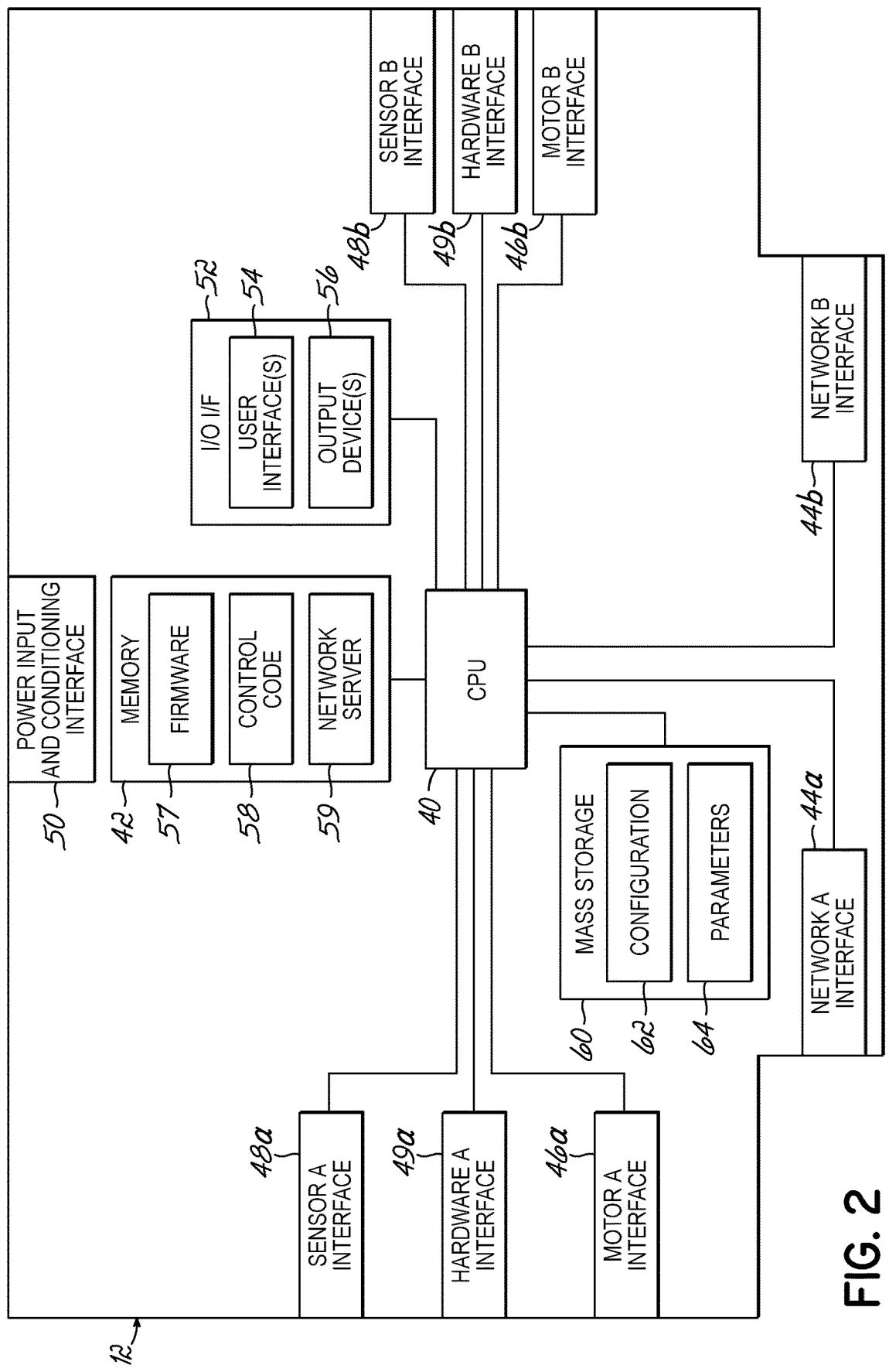
FIG. 2 is a diagrammatic illustration of a controller of FIG. 1.

FIG. 2 is a diagrammatic illustration of a hardware and software environment of a controller 12 consistent with embodiments of the invention. The controller 12 includes at least one central processing unit ("CPU") 40 coupled to a memory 42. Each CPU 40 is typically implemented in hardware using circuit logic disposed in one or more physical integrated circuit devices, or chips, and may be comprised of one or more microprocessors, micro-controllers, field programmable gate arrays ("FPGAs"), or ASICs. Memory 42 may include random access memory ("RAM"), dynamic random access memory ("DRAM"), static random access memory ("SRAM"), flash memory, electronically erasable programmable read-only memory ("EEPROM") and/or another digital storage medium, and is also typically implemented using circuit logic disposed on one or more physical integrated circuit devices, or chips. As such, memory 42 may be considered to include memory storage physically located elsewhere in the controller 12, e.g., any cache memory in the a CPU 40, as well as any storage capacity used as a virtual memory, e.g., as stored on a computing system 90 (FIG. 2) or another controller 12 coupled to the controller 12 through at least one network interface 44a, 44b (illustrated as "Network A Interface" 44a and "Network B Interface 44b).

The controller 12 is configured to couple to up to two motorized rollers 18 through respective motor interfaces 46a, 46b (illustrated as "Motor A Interface" 46a and "Motor B Interface" 46b). In particular, the CPU 40 is configured to control the motors (not shown) of the motorized rollers 18 by selectively providing power to the motors as well as determining the rotational state of the motorized rollers 18. Each motor interface 46a, 46b allows the CPU 40 to provide power to and determine information about a motor of a motorized roller 18. In particular, the motor interface 46a, 46b may be generally utilized for brushless DC ("BLDC") motor commutation control to control the rotational speed of a motorized roller 18. More specifically, the motor interface 46a, 46b includes the ability to selectively energize particular windings of a motor connected thereto to turn a motorized roller, sense the current consumed by the motor connected thereto, and detect the rotational state of the motor connected thereto. The motor interface 46a, 46b may also include the ability to control a brake (not shown) associated with the motor.

In addition to the motorized rollers 18, the CPU 40 is configured to couple to up to two sensors 22 through respective sensor interfaces 48a, 48b (illustrated as "Sensor A Interface" 48a and "Sensor B Interface" 48b). The controller 12 is also configured to couple to up to two pieces of additional hardware (not shown) (e.g., such as additional sensors 22 that are not connected through the sensor interfaces 48a, 48b) through respective hardware interfaces 49a, 49b (illustrated as "Hardware A Interface" 49a and "Hardware B Interface" 49b). The controller 12 is configured to receive power from the power supply unit 24 through a power input and conditioning interface 50.

The CPU 40 is further configured to receive input from a user and/or provide a human-perceptible output to a user through an input/output device interface 52 (illustrated and referred to hereinafter as "I/O I/F" 52). In some embodiments, the I/O I/F 52 is configured to receive data from the user through at least one user interface 54 (including, for example, one or more softkeys, a keyboard, mouse, a microphone, and/or other user interface), and/or provide a human-perceptible output to the user through at least one output device 5 (including, for example, one or more LEDs providing specific information, a display, speakers, a printer, and/or another output device). In some embodiments, the I/O I/F 52 communicates with a device that is operative as a user interface 54 and output device 56 in combination, such as a touch screen display (not shown). In specific embodiments, the at least one user interface 54 includes a softkey that, upon an actuation lasting a first predetermined amount of time, allows the CPU 40 to determine that the user desires to automatically configure a plurality of controllers 12, and, upon an actuation lasting a second predetermined amount of time, allows the CPU 40 to determine that the user desires to reset the controller 12. In further specific embodiments, the at least one output device 56 includes a plurality of LEDs that indicate, respectively, network connectivity through the network interfaces 44a, 44b, network traffic through the network interfaces 44a, 44b, a status of a network to which the controller 12 is connected, a status of one or more respective motors of respective motorized rollers 18 connected to the motor interfaces 46a, 46b, a status of one or more respective sensors 22 connected to the sensor interfaces 48a, 48b, a status of one or more respective pieces of hardware connected to the hardware interfaces 49a, 49b, a status of power to the controller 12, and/or a status of the controller 12.

The controller 12 is typically under the control of firmware 57 as well as an operating system, application, and/or other program code configured to control the controller 12 (illustrated and referred to hereinafter as "Control Code") 58. As such, the controller 12 executes or otherwise relies upon various computer software applications, sequences of operations, components, programs, files, objects, modules, etc., consistent with embodiments of the invention. In specific embodiments, the firmware 57 includes data to control the components of the controller 12 while the control code 58 is executed to perform various operations consistent with embodiments of the invention. The controller 12 also includes a network server 59, which may include a web server and/or a DHCP server. As such, the network server 59 allows a separate computing system 90 (FIG. 3) to directly access information from the controller 12 through a network 82 (FIG. 3) and/or allows the separate computing system 90 to be directly connected to the controller 12 to automatically configure a TCP/IP connection therewith.

The controller 12 is also configured with a mass storage device 60 that may store data for to operate the controller 12 or other controllers 12. In specific embodiments, the mass storage device 60 includes the configuration data of the controller 12 as well as the configuration data for adjacent controllers 12 in a configuration data structure 62. The mass storage may also store parameters for operation, such as its IP address, subnet mask, gateway, and other data structures, such as lists or lookup tables, that may be used to in the configuration and/or operation of the controller 12 in a parameters data structure 64.

Figure 3:
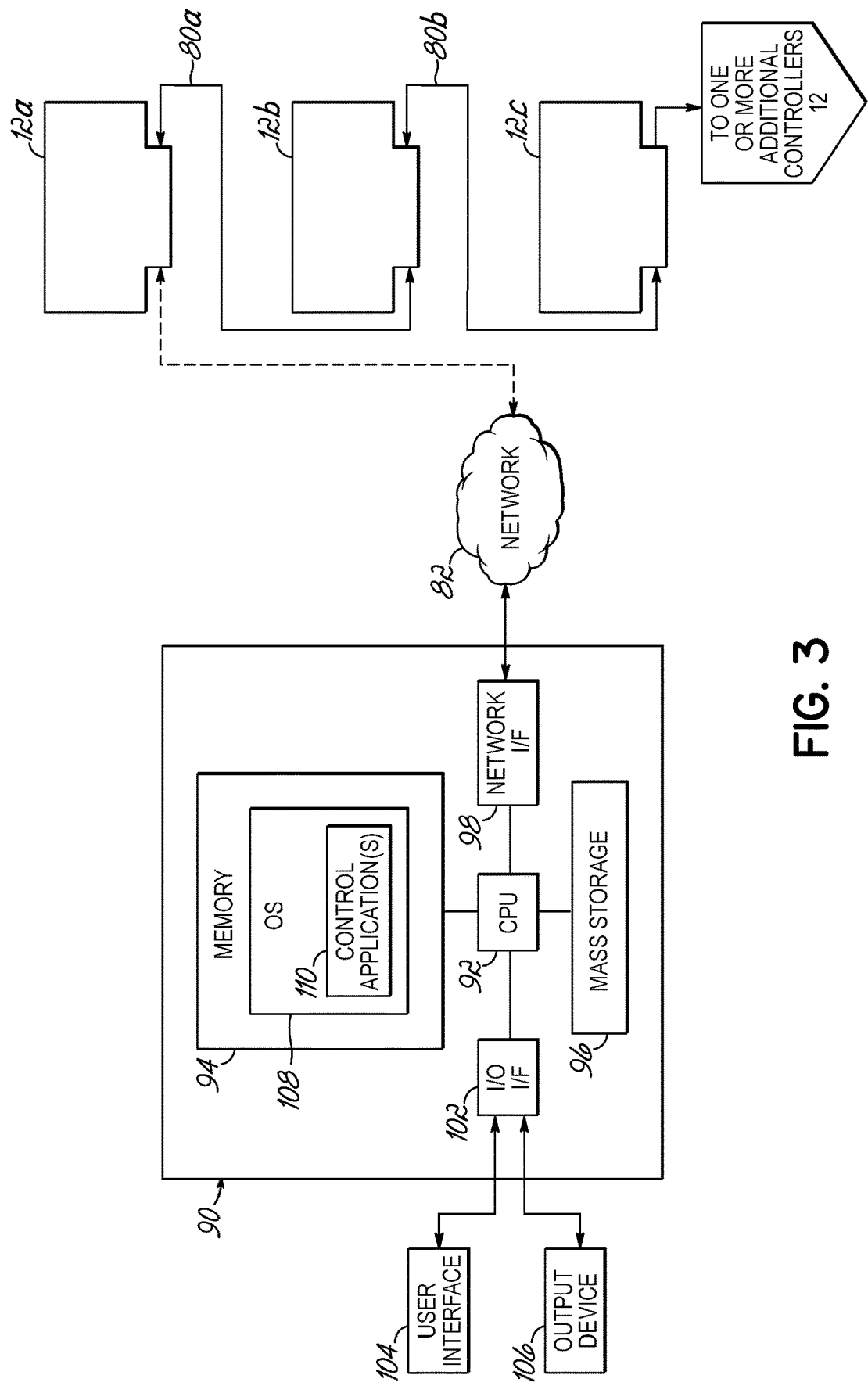
FIG. 3 is a diagrammatic illustration of a computer connected to the controllers of FIG. 1.

The controller 12 may be configured to operate alone or in conjunction with at least one additional controller 12. Moreover, the controller 12 may be configured to controlled externally, such as with the aforementioned computing system 90. As such, and consistent with embodiments of the invention, FIG. 3 is a diagrammatic illustration showing interconnection between a plurality of controllers 12a-c via communication links 80a-c as well as the connection of one or more controllers 12 to at least one network 82 for control thereby with a computing system 90. In specific embodiments, each communication link 80 between controllers 12 is achieved through a network cable, such as a Category 5 cable used for Ethernet network communications. One controller 12a may be configured to communicate with a separate controller 12b, 12c directly (e.g., in the case of controller 12b) or indirectly (e.g., in the case of controller 12c).

As discussed above, the conveyor system 10 may include a computing system 90 operable to control the controllers 12a-c and thus the operation of the conveyor system 10. The computing system 90 includes at least CPU 92 coupled to a memory 94. Each CPU 92 is typically implemented in hardware using circuit logic disposed on one or more physical integrated circuit devices or chips and may be one or more microprocessors, micro-controllers, FPGAs, or ASICs. Memory 94 may include RAM, DRAM, SRAM, flash memory, and/or another digital storage medium, and also typically implemented using circuit logic disposed on one or more physical integrated circuit devices, or chips. As such, memory 94 may be considered to include memory storage physically located elsewhere in the computing system 90, e.g., any cache memory in the at least one CPU 92, as well as any storage capacity used as a virtual memory, e.g., as stored on a mass storage device 96, another computing system (not shown), a network storage device (e.g., a tape drive) (not shown), or another network device (not shown) coupled to the computing system 90 through at least one network interface 98 (illustrated and referred to hereinafter as "network I/F" 98) by way of the at least one network 82. The network I/F 98 may be connected to the network 82 wirelessly (e.g., through one of the numerous IEEE 802 standards) or through a hard-wire link (e.g., an Ethernet cable). It will be appreciated that the at least one network 82 may include at least one private communications network (e.g., such as an intranet) and/or at least one public communications network (e.g., such as the Internet).

As such, the computing system 90, in specific embodiments, is a computer, computer system, computing device, server, disk array, or programmable device such as a multi-user computer, a single-user computer, a handheld computing device, a networked device (including a computer in a cluster configuration), a mobile telecommunications device, a telecommunications capable device, a video game console (or other gaming system), etc. In specific embodiments, the computing system 90 is an iPhone® or iPad® as distributed by Apple Inc., of Cupertino, Calif.

The computing system 90 is coupled to at least one peripheral device through an input/output device interface 102 (illustrated as, and hereinafter, "I/O I/F" 102). In particular, the computing system 90 receives data from a user through at least one user interface 104 (including, for example, a keyboard, mouse, a microphone, and/or other user interface) and/or outputs data to the user through at least one output device 106 (including, for example, a display, speakers, a printer, and/or another output device). Moreover, in some embodiments, the I/O I/F 102 communicates with a device that is operative as a user interface 104 and output device 106 in combination, such as a touch screen display (not shown).

The computing system 90 is typically under the control of an operating system 108 and executes or otherwise relies upon various computer software applications, sequences of operations, components, programs, files, objects, modules, etc., consistent with embodiments of the invention. In specific embodiments, the computing system 90 executes or otherwise relies on a control application 110 to manage the operation of the controllers 12a-c and the conveyor system 10.

Consistent with embodiments of the invention, a controller 12 may be configured to operate in an autonomous fashion, a collectively autonomous fashion, or a dependent fashion. When operating in an autonomous fashion, the controller 12 is not controlled by the computing system 90 and operates without any concern to one or more controllers 12 located upstream or downstream along the downstream direction 26, if any. As such, the controller 12 simply controls a portion of the conveyor assembly 14 to convey an article 23 along the downstream direction 26 without regard to additional controllers 12. The autonomous operation may be advantageous when there is conveyor system 10 that does not require additional controllers 12 and merely operates to consistently move articles 23 along that surface. When operating in a collective fashion, multiple controllers 12 are configured to share information upstream and/or downstream in order to move the article 23 in the downstream direction 26, but are not otherwise controlled by the computing system 90. The collective operation may be advantageous when there is a conveyor system 10 that does not include merges, joins, article sorting, or other article manipulating sections (but may nevertheless include turns, inclines, declines) and is used to convey an article 23 along a path. When operating in a dependent fashion, one or more controllers 12 are configured to be controlled by the computing system 90. The dependent operation may be advantageous when there is a conveyor system 10 that includes merges, joins, article sorting, and/or other article manipulating sections that requires complex movement and adjustment of articles 23 as they are conveyed along the conveyor system 10.

In any event, the controllers 12 include a number of operations, operational modes, and functions that assist in conveying articles. For example, a controller 12 is configured to automatically determine information about the conveyor assembly 14 to which it is connected, and more particularly information about the motorized rollers 18, sensors 22, and/or additional hardware configured thereupon. The controllers 12, in turn, use BLDC commutation control to control the rotational speed and/or state of the motorized rollers 18. The controllers 12 may also use current feedback from a motorized roller 18 to determine whether an article 23 is being conveyed as well as use rotation feedback from the motorized roller 18 to determine the position of an article 23 being conveyed. The controller 12 may also use the current feedback, rotation feedback, and/or additional information to determine the weight and length of the article 23.

In addition to providing power to rotate a motorized roller 18, the controller 12 is configured to stop the motorized roller 18 in a number of ways. For example, conventional methods of stopping a motorized roller 18 include shunting windings of the motor of the motorized roller 18 to ground or engaging a brake (not shown) of the motorized roller 18. However, the controller 12 may be configured to stop a motorized roller 18 through a gravity stop or through a servo-lock stop. With a gravity stop, the controller 12 may disconnect the motor of the motorized roller 18 from any ground signal or power signal. Advantageously, the gravity stop allows the motorized roller 18 to briefly rotate after the power thereto has been stopped, but otherwise prevents excessive power usage by the motorized rollers 18. In the servo-lock stop, the controller 12 maintains the motorized roller 18 at the rotational position at which it has stopped. For example, if the motorized roller 18 is on an incline or decline, the servo-lock stop allows the controller 12 to maintain the motorized roller 18 at a particular rotational position, advantageously maintaining an article 23 loading that motorized roller 18 at a particular position.

Multiple controllers 12 networked together (such as in a conveyor system 10 having a linear conveyor or other conveyor run) may automatically configure themselves when configured in an uninterrupted path of one or more conveyor assemblies 14 with no merge or divert mechanisms, but possibly curved sections. This arrangement is more commonly referred to as a "linear conveyor." As such, the controllers 12 are configured along the linear conveyor and interconnected via communication links 80. The furthest upstream controller 12 may then be interfaced with (such as through a user interface 54 that includes a softkey) to begin an automatic configuration procedure. The automatic configuration procedure, discussed in more detail below, automatically configures each of the controllers 12 to control one or more respective zones of the linear conveyor such that the linear conveyor may be used to convey articles 23 thereon in the downstream direction 26.

The controllers 12 communicate with each other through the communications links 80 to access information about zones, articles 23, and controllers 12 upstream and downstream to dynamically adjust the operation of the conveyor system 10. The controllers 12 also store configuration of each controller 12 to which they are adjacent. For example, when a conveyor system 10 includes a plurality of controllers, the first controller 12 (e.g., most upstream controller in a downstream direction 26) stores its configuration data and the configuration data of the second controller 12, the second controller 12 stores its configuration data and the configuration data of the first controller 12 and third controller 12 (if present), and so-on with the last controller 12 storing its configuration data and the configuration data of the next-to-last controller 12. As such, when a controller 12 is removed, the replacement controller 12 may automatically access appropriate stored configuration data in an adjacent controller 12. The controllers 12 may use UDP for transferring configuration data, Modbus TCP for controller-to-controller communication, and Ethernet/IP for other communications.

Controllers 12 may be used to convey articles 23 along a conveyor system 10 in a zone singulation mode (in which there is a zone gap between articles), a flex zone mode (in which first article is longer than a second article such that the first article is assigned more zones than that second article), a train mode (in which all upstream zones from a downstream zone run articles in a "train" when the downstream zone releases an article), and a gap train mode (which is similar to the train mode, but is a mode in which the controllers 12 configure a time delay between the articles in the train).

One additional mode of operation for the controllers 12 is a mode in which a controller 12 detects the movement of a motorized roller 18 that was previously stationary and then activates one or more motorized rollers 18 connected thereto to move an article 23 along the conveyor system 10. For example, an article 23 may be situated on a conveyor system 10 and stationary. When a user pushes the article 23 along the conveyor system 10, a motorized roller 18 associated therewith is rotated. A controller 12 senses this motion, conveys the article 23 through its zones, and sends messages to at least one downstream controller 12 to convey the article 23 as well. This "touch and go" mode may be advantageous in facilities where leaving conveyor systems 10 constantly running (e.g., leaving motorized rollers 18 constantly turning) is inefficient, unwanted, or unnecessary. As such, a user may start the conveyor system 10 by placing an article 23 thereon and pushing the article therealong. In one embodiment, the controllers 12 of the conveyor system 10 activate the motorized rollers 18 until all articles 23 on the conveyor system 10 have been discharged. In an alternative embodiment, the controllers 12 of the conveyor system 10 gradually increase and decrease the speed of the motorized rollers 18 for respective zones as the articles 23 are adjacent to or pass through those zones until all articles 23 on the conveyor system 10 have been discharged.

During operation, the controllers 12 can "look ahead" to at least one downstream zone to determine whether it is occupied by an article 23, and adjust the speed of the motorized rollers 18 accordingly. In this manner, higher speed applications where increased stopping distance is required can keep the articles 23 from over-traveling their stop positions. This "look-ahead-slow-down" mode also allows the controllers 12 to keep from losing articles 23 between zones, which may happen if momentum carries an article 23 that is to be slowed in the area between zones where it may not be sensed by a sensor 22.

The controllers 12 are also configured to detect jams, or potential jams, when an article 23 does not reach a sensor 22 within a predetermined amount of time, or when an article 23 is constantly detected by a sensor 22 for a predetermined amount of time. When a jam is detected, the controller 12 may reverse an appropriate motorized roller 18 in an attempt to clear that jam.

Figure 4:
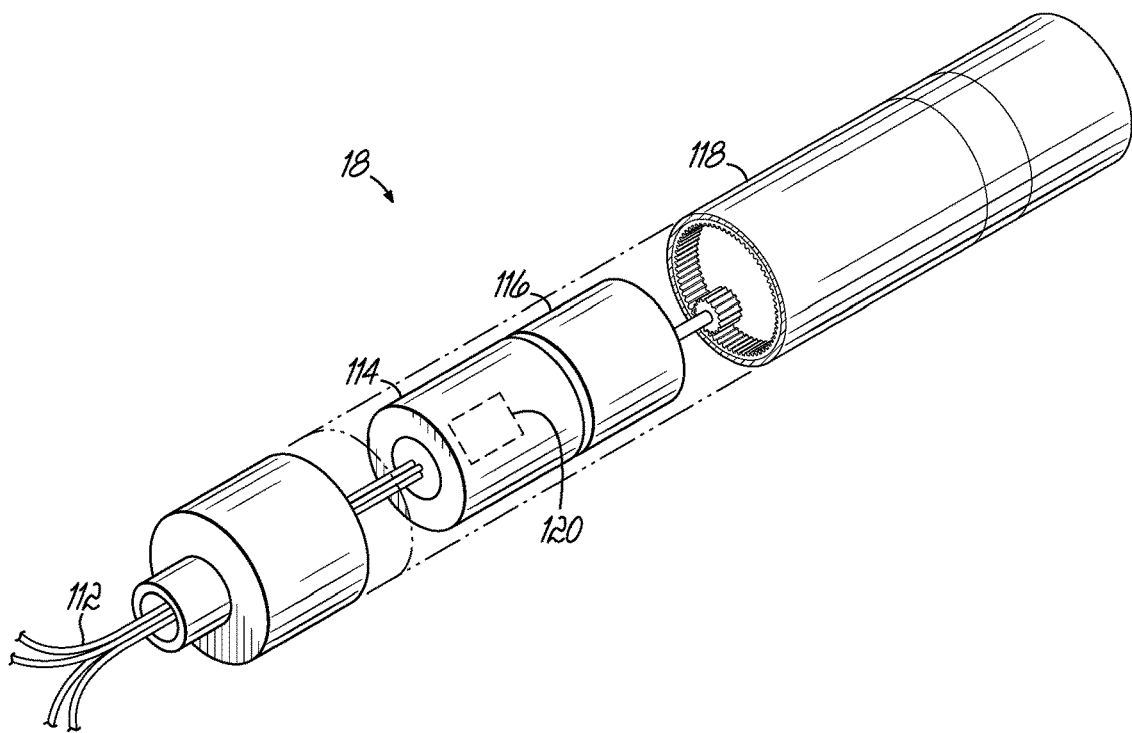
FIG. 4 is a partial cut-away perspective view of a motorized roller of the conveyor system of FIG. 1.

FIG. 4 is a partially transparent view of a motorized roller 18 consistent with embodiments of the invention. The motorized roller 18 is connected to a controller 12 through various wires as at 102. In turn, the wires 112 may provide various signals or connection (e.g., a voltage signal, a current signal, a connection to ground) to one or more components of the motorized roller 18. More specifically, the wires 112 may carry one or more signals, such as a voltage, current, or ground signal, for a motor 114 of the motorized roller. The motor 114, when energized, rotates and turns a gearbox 116. The gearbox 116 is coupled to the housing 118 of the motorized roller 18 and operates to translate the rotation of the motor 114 into rotation of the housing 118 at a fixed ratio. In specific embodiments, the gearbox 116 may operate to translate sixty rotations of the motor 114 into one rotation of the housing 118 such that the gearbox 116 has a ratio of approximately 60-1. Moreover, the motorized roller 18 may include one or more addressable circuits 110, such as processing circuitry with memory, that can be queried for information associated with the motorized roller 18. As such, a controller 12 connected to the motorized roller 18 may query the motorized roller 18, and in particular the addressable circuit 110 thereof, for information and determine at least one operational characteristic associated with that motorized roller 18. For example, the operational characteristic may include a gear ratio of the gearbox 116 or a current threshold (e.g., a maximum current) for the motor. The controller 12 may then determine information and/or control the motorized roller 18 accordingly (e.g., determine the distance of rotation of the housing 118 of the motorized roller 18 from a pulse of voltage and/or keep the current supplied to the motorized roller 18 below the current threshold).

A person having ordinary skill in the art will recognize that the environments illustrated in FIGS. 1-4 are not intended to limit the scope of embodiments of the invention. In particular, conveyor system 10, controller 12, and/or computing system 90 may include fewer or additional components consistent with alternative embodiments of the invention. Indeed, a person having skill in the art will recognize that other alternative hardware and/or software environments may be used without departing from the scope of the invention. Additionally, a person having ordinary skill in the art will appreciate that the controller 12 and/or computing system 90 may include more or fewer applications configured therein. As such, other alternative hardware and software environments may be used without departing from the scope of embodiments of the invention.

The routines executed to implement the embodiments of the invention, whether implemented as part of an operating system or a specific application, component, program, object, module or sequence of instructions executed by one or more controllers 12 and/or computing systems 90 will be referred to herein as a "sequence of operations," a "program product," or, more simply, "program code." The program code typically comprises one or more instructions that are resident at various times in various memory and storage devices in a controller 12 and/or computing system 90, and that, when read and executed by one or more CPUs 40 and/or 92 of the respective controllers 12 and/or computing system 90, cause that controller 12 and/or computing system 90 to perform the steps necessary to execute steps, elements, and/or blocks embodying the various aspects of the invention.

While the invention has and hereinafter will be described in the context of fully functioning controllers 12 and/or computing systems 90, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and nonvolatile memory devices, floppy and other removable disks, hard disk drives, optical disks (e.g., CD-ROM's, DVD's, etc.), among others.

In addition, various program code described hereinabove or hereinafter may be identified based upon the application or software component within which it is implemented in a specific embodiment of the invention. However, it should be appreciated that any particular program nomenclature is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 5:
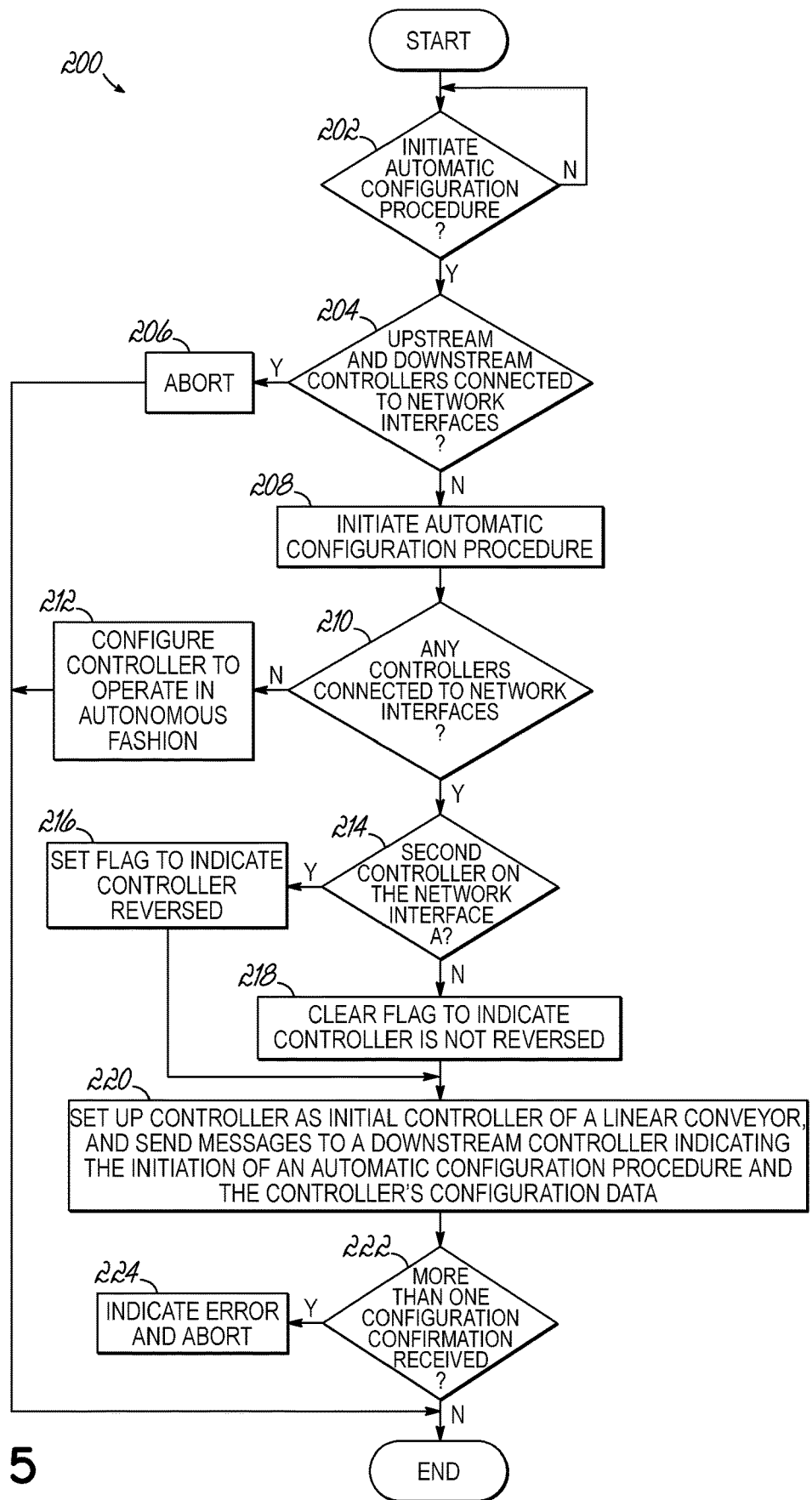
FIG. 5 is a flowchart illustrating a sequence of operations that may be performed by the controller of FIG. 1. during the automatic configuration thereof.

In some embodiments, the controllers 12 of the conveyor system 10 are configured by the computing system 90. As such, each the computing system 90 designates the function of each controller 12 and how it is to operate in the conveyor system 10. However, in alternative embodiments, at least a portion of the conveyor system 10 is a linear conveyor. As such, the controllers 12 for the linear conveyor may be configured in an automatic configuration procedure consistent with embodiments of the invention. FIG. 5 is a flowchart 200 illustrating a sequence of operations that may be performed by a controller 12 during an automatic configuration procedure. In particular, the sequence of operations of FIG. 5 may be performed by a controller 12 configured as the initial controller 12 of a linear conveyor. As such, the controller 12 determines whether to initiate an automatic configuration procedure (block 202). Specifically, a user may initiate an automatic configuration procedure by pressing and holding a softkey of a user interface 54 for a predetermined amount of time. When the controller 12 determines not to initiate an automatic configuration procedure ("No" branch of decision block 202), the sequence of operations returns to block 202. When the controller 12 determines to initiate an automatic configuration procedure ("Yes" branch of decision block 202), the controller 12 determines whether there are upstream and downstream controllers 12 connected thereto.

In some embodiments, the controller 12 determines whether there are upstream and downstream controllers 12 connected thereto by polling its network interfaces 44a, 44b to determine if controllers 12 are connected thereto through communication links 80a, 80b. If there is a response to a poll on a network interface 44a, 44b, the controller 12 determines that a controller 12 is connected to that network interface 44a, 44b. When there are both upstream and downstream controllers 12 connected to the network interfaces 44a, 44b of the controller 12 initiating the automatic configuration procedure ("Yes" branch of decision block 204), the controller 12 indicates an error and aborts the automatic configuration procedure (block 206). Advantageously, preventing an automatic configuration procedure for a controller 12 that is situated between at least two additional controllers 12 prevents network and resource contention. However, when there are not both upstream and downstream controllers 12 connected to the network interfaces 44a, 44b of the controller 12 initiating the automatic configuration procedure ("No" branch of decision block 204), the controller 12 initiating the automatic configuration procedure (referred to hereinafter for this sequence of operations as the "first" controller 12) initiates the automatic configuration procedure (block 208) and determines whether there are is a second controller 12 connected to one of its network interfaces 44a, 44b (block 210).

When the first controller 12 determines that there is not a second controller 12 connected to one of its network interfaces 44a, 44b ("No" branch of decision block 210), the first controller 12 configures itself to operate in an autonomous fashion (block 212). However, when the first controller 12 determines that there is a second controller 12 connected to one of its network interfaces 44a, 44b ("Yes" branch of decision block 210), the first controller 12 determines whether the second controller 12 is connected to its first network interface 44a (block 214). Specifically, each controller 12 is configured with a default that indicates that a downstream direction 26 is to proceed from the "A" side, or "left" side, of the controller 12 (e.g., the side with network interface 44a, motor interface 46a, sensor interface 48a, and hardware interface 49a) to the "B" side, or "right" side of the controller 12 (e.g., the side with network interface 44b, motor interface 46b, sensor interface 48b, and hardware interface 49b). Thus, when the second controller 12 is connected to the first network interface 44a of the first controller 12 ("Yes" branch of decision block 214), the first controller 12 sets a flag to indicate that the downstream direction 26 is reversed from its presumed direction (block 216). However, when the second controller 12 is connected to the second network interface 44b of the first controller ("No" branch of decision block 214), the first controller 12 clears a flag to indicate that the downstream direction 26 is not reversed from its presumed direction (block 218).

In response to setting a flag or clearing a flag indicating whether the downstream direction 26 is reversed from its presumed direction (block 216 or block 218), the first controller 12 sets itself up as the "initial" controller 12 of a linear conveyor, and sends one or more messages to the second, or "downstream," controller 12 indicating the initiation of an automatic configuration procedure as well as configuration data of the first controller 12 (block 220). In some embodiments, the first controller 12 sets itself as the initial controller 12 by setting its network address to a predetermined network address. For example, if the current IP address of the first controller 12 is 192.168.0.45, the first controller 12 sets itself as the initial controller 12 by setting its IP address to 192.168.0.20. The first controller 12 also sets itself as the initial controller 12 by determining its subnet mask and gateway and providing the subnet mask and gateway to downstream controllers 12. In any event, the first controller 12 may send multiple messages in block 220, including a first message (referred to hereinafter as an "configuration initiator" message) that indicates that the initiation of an automatic configuration procedure and a second message (referred to hereinafter as a "configuration token") that includes at least the serial number of the first controller 12, its IP address, the subnet mask, and/or gateway of the first controller 12.

In any event, after sending the configuration initiator and/or the configuration token (block 220), the first controller 12 determines whether multiple configuration confirmation messages from downstream controllers 12 have been received (222). When multiple configuration confirmation messages have not been received ("No" branch of decision block 222"), this indicates that there are not two independent network branches from the first controller 12 to downstream controllers 12, and the sequence of operations may end. However, when multiple configuration messages have been received ("Yes" branch of decision block 222), this indicates that there are at least two independent network branches from the first controller 12 to downstream controllers 12, and thus the first controller 12 indicates and error and aborts the automatic configuration procedure (block 224).

Figure 6:
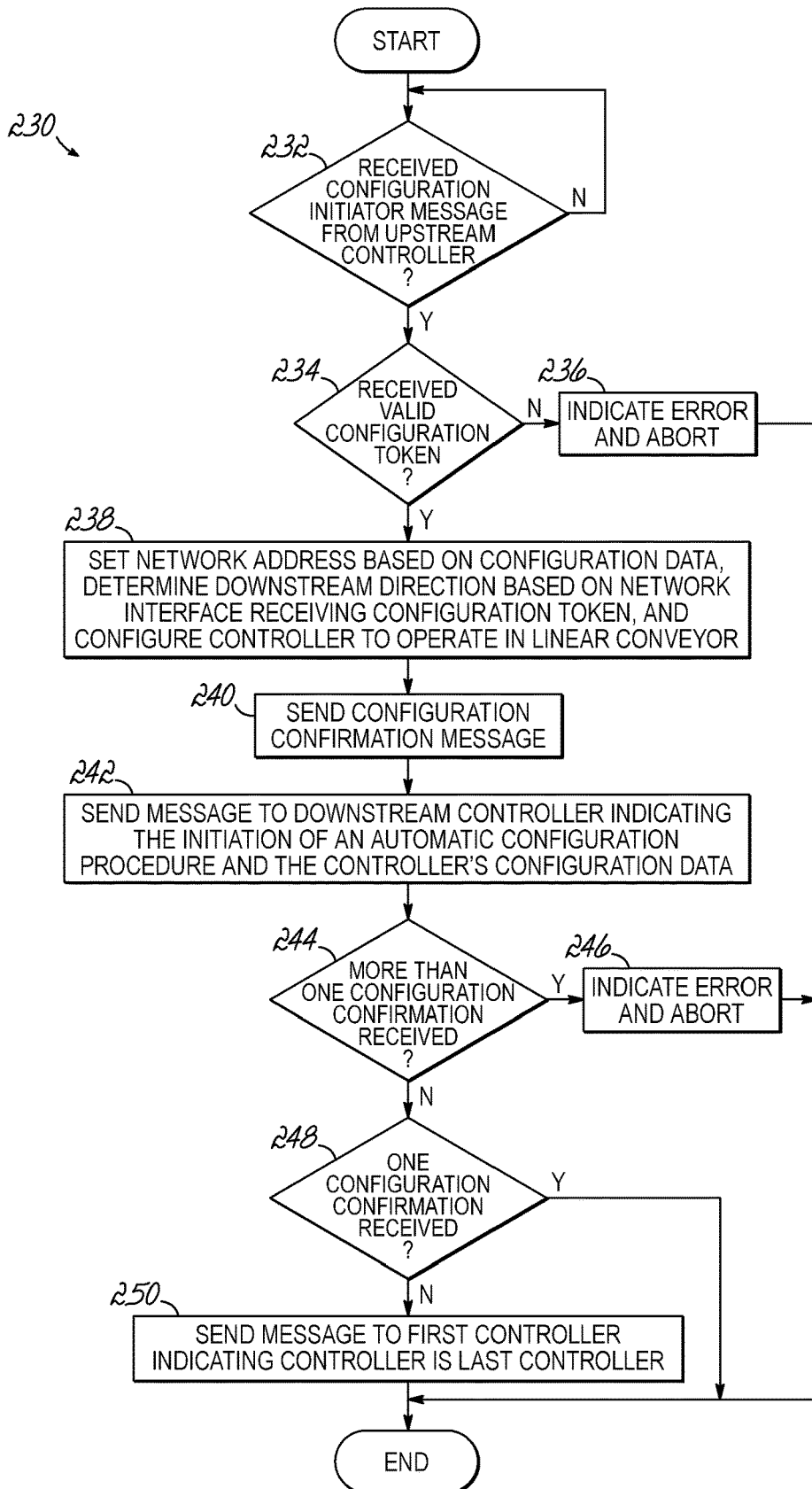
FIG. 6 is a flowchart illustrating a sequence of operations that may be performed by the controller of FIG. 1. during the automatic configuration thereof when such controller is a downstream controller.

FIG. 6 is a flowchart 230 illustrating a sequence of operations that may be performed by a downstream controller 12 during an automatic configuration procedure consistent with embodiments of the invention. The downstream controller 12, upon being started, determines whether a configuration initiator message has been received from an upstream controller 12 (e.g., the first controller 12 or a controller 12 between the first controller 12 and the controller 12 performing this sequence of operations) (block 232). When a configuration initiator message has not been received ("No" branch of decision block 232), the downstream controller 12 may return to block 232. When a configuration initiator message has been received ("Yes" branch of decision block 232), the downstream controller 12 determines whether it has received a valid configuration token within a predetermined amount of time (e.g., twenty seconds) (block 234). For example, a configuration token may be invalid when at least some of the data expected therein is missing or corrupt. In any event, when the downstream controller 12 has not received a valid configuration token within the predetermined amount of time, or when the controller 12 has received an invalid configuration token ("No" branch of decision block 234), the downstream controller 12 indicates and error and aborts the automatic configuration procedure (block 236).

When the downstream controller 12 receives a valid configuration token within the predetermined amount of time ("Yes" branch of decision block 234), the downstream controller 12 sets its network address based on the network address included in the configuration token, determines the downstream direction 26 based on which network interface the 44a, 44b received configuration token, and otherwise configures itself to operate in a linear conveyor based on the data in the configuration token (block 238). In specific embodiments, the downstream controller 12 sets its network address in block 238 by adding a fixed value to the received network address. For example, if the network address received in the configuration token is 192.168.0.24, the downstream controller 12 may add a fixed value of one to the network address and thus set its network address to 192.168.0.25. Moreover, in block 238, the downstream controller 12 determines that the downstream direction 26 is its presumed direction when it receives the configuration token on network interface 44a on its "A," or "left," side. Correspondingly the downstream controller 12 determines that the downstream direction 26 is reversed from its presumed direction when the downstream controller 12 receives the configuration token on network interface 44b on its "B," or "right," side. Also in block 238, the downstream controller 12 sets its subnet mask, and/or gateway based on information in the configuration token.

After configuring itself to operate in a linear conveyor (block 238), the downstream controller 12 sends a configuration confirmation message back upstream through the network interface 44a, 44b that received the configuration token (block 240) and sends a configuration initiator message and a configuration token for an additional downstream controller 12 through the network interface 44a, 44b that did not receive the configuration token (block 242). The downstream controller 12 then determines whether multiple configuration confirmation messages from additional downstream controllers 12 have been received (244). When multiple configuration confirmation messages have been received ("Yes" branch of decision block 244), the downstream controller 12 indicates and error and aborts the automatic configuration procedure (block 246). However, when multiple configuration confirmation messages have not been received (e.g., one configuration confirmation message has been received or no configuration confirmation message has been received) ("No" branch of decision block 244), the downstream controller 12 determines whether one configuration confirmation message has been received (block 248). When no configuration confirmation message has been received ("No" branch of decision block 248), the downstream controller 12 sends a message (referred to hereinafter as a "last controller" message) indicating that it is the last controller 12 in a linear conveyor to the first controller 12 (e.g., through any upstream controllers 12 previously configured) (block 250). In response to determining that a configuration confirmation message has been received ("Yes" branch of decision block 248) or sending a last controller message (block 250), the sequence of operations may end.

Figure 7:
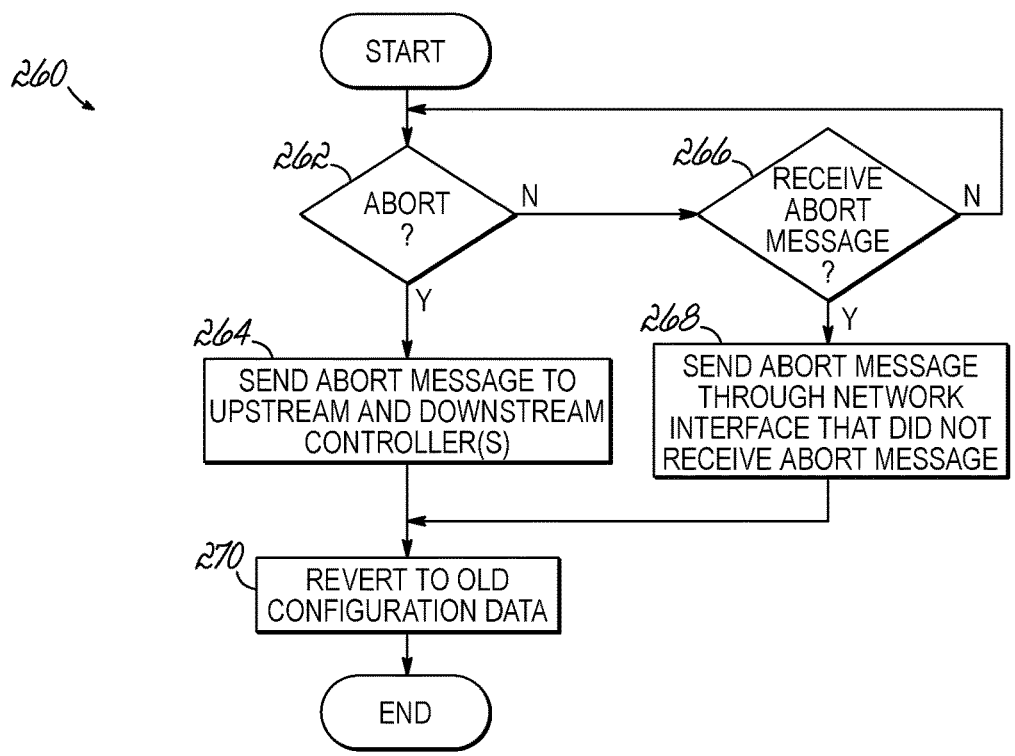
FIG. 7 is a flowchart illustrating a sequence of operations that may be performed by the controller of FIG. 1. to abort the automatic configuration thereof.

FIG. 7 is a flowchart 260 illustrating a sequence of operations for a subroutine of a controller 12 (e.g., a first controller 12 or a downstream controller 12) to abort an automatic configuration procedure consistent with embodiments of the invention. In particular, the subroutine determines whether the controller 12 has aborted an automatic configuration procedure (block 262). When the controller 12 has aborted an automatic configuration procedure ("Yes" branch of decision block 262), the subroutine causes the controller 12 to send an abort message to any upstream and downstream controllers 12 connected thereto (block 264). However, when the controller 12 has not aborted an automatic configuration procedure ("No" branch of decision block 262), the subroutine determines whether the controller 12 has received an abort message on a network interface 44a, 44b (block 266). When the controller 12 has not received an abort message on a network interface 44a, 44b ("No" branch of decision block 266), the sequence of operations returns to block 262. However, when the controller 12 has received an abort message on a network interface 44a, 44b ("Yes" branch of decision block 266), the controller forwards the abort message through the network interface 44a, 44b that did not receive the abort message (block 268). When the controller 12 sends an abort message (block 264) or forwards an abort message (block 268), the controller 12 reverts its configuration data to the configuration used before the initiation of an automatic configuration procedure (block 270).

Figure 8:
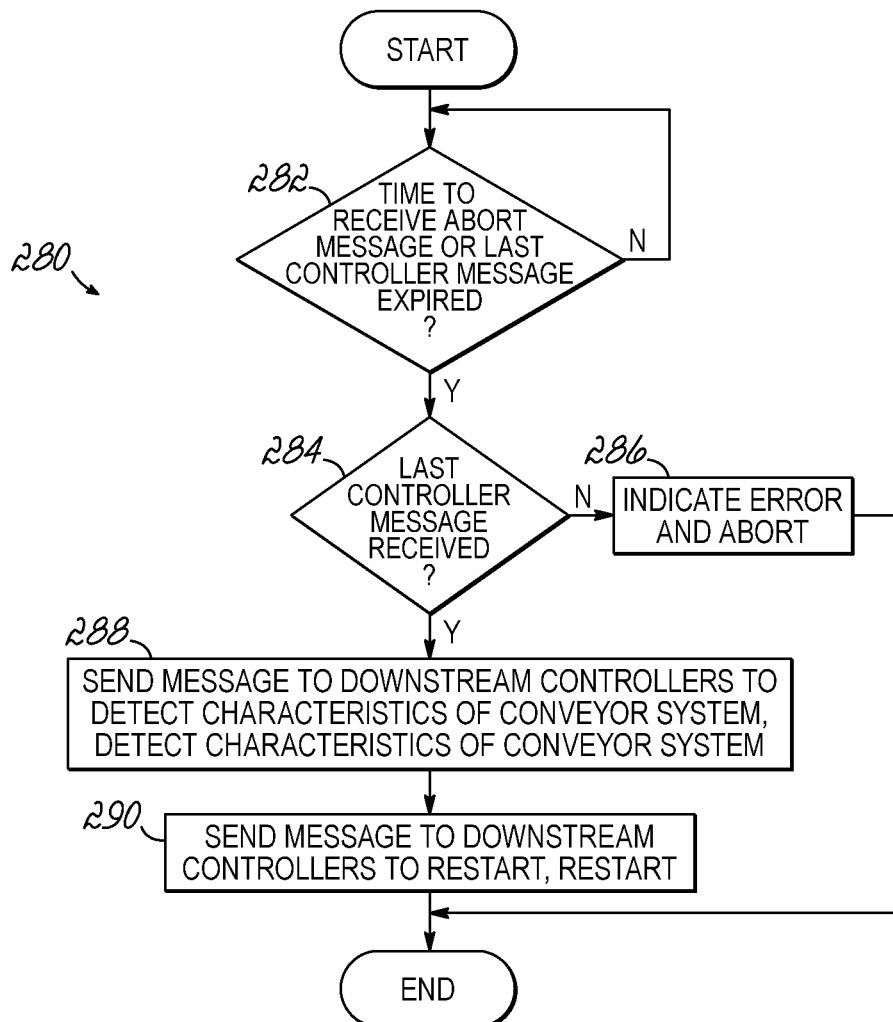
FIG. 8 is a flowchart illustrating a sequence of operations that may be performed by the controller of FIG. 1. to automatically configure itself as the first controller of a linear conveyor.

FIG. 8 is a flowchart 280 illustrating a sequence of operations for a first controller 12 of a linear conveyor to finalize the automatic configuration of the controllers 12 therein consistent with embodiments of the invention. In particular, the first controller 12 determines whether a predetermined time (e.g., about five minutes) in which to receive an abort message or a last controller message has expired (block 282). When the predetermined time has not expired ("No" branch of decision block 282), the sequence of operations may return to block 282. However, when the predetermined time has expired ("Yes" branch of decision block 282), the first controller 12 determines whether a last controller message has been received (block 284). When a last controller message has not been received ("No" branch of decision block 284), the first controller 12 indicates and error and aborts the automatic configuration procedure (block 286). However, when a last controller message has been received ("Yes" branch of decision block 284), the first controller 12 sends a message to the downstream controllers 12 to detect characteristics of the portion of the conveyor system 10 to which they are attached and performs its own detection of characteristics of the portion of the conveyor system 10 to which it is attached (block 288). The first controller 12 then sends a message to the downstream controllers 12 to restart, then restarts itself (block 290).

Figure 9:
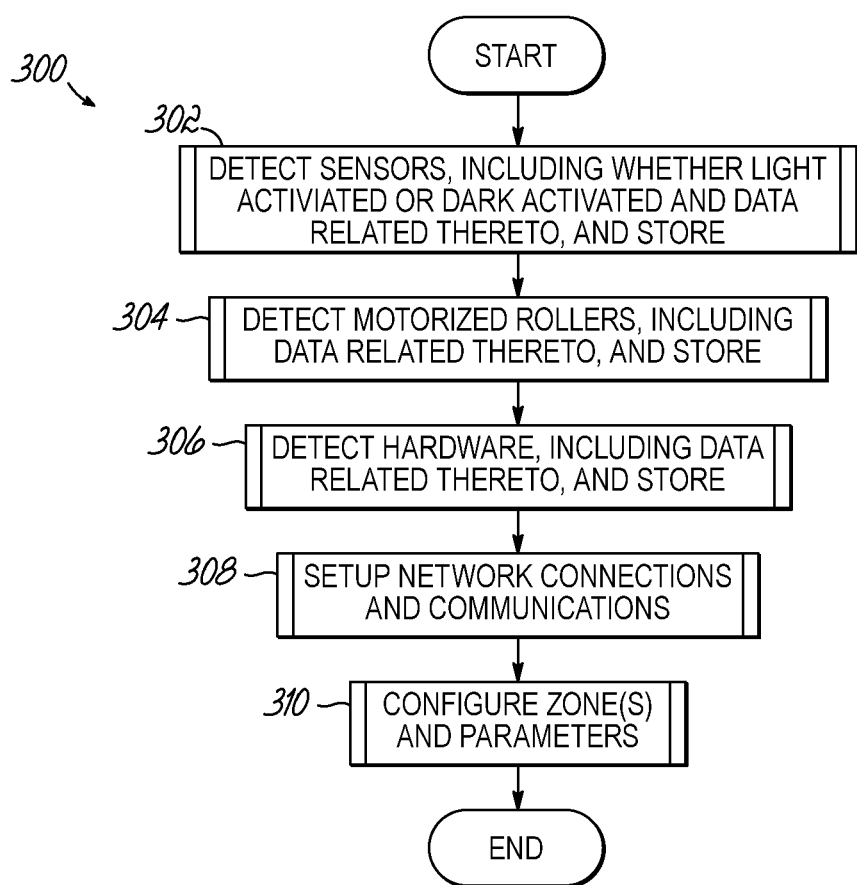
FIG. 9 is a flowchart illustrating a sequence of operations that may be performed by the controller of FIG. 1. to detect characteristics of at least a portion of the conveyor system to which it is configured.

FIG. 9 is a flowchart 300 illustrating a sequence of operations for a controller 12 (e.g., a first controller 12 or a downstream controller 12) to detect characteristics of the portion of the conveyor system 10 to which it is configured or attached. In particular, the controller 12 initially detects any sensors 22 connected to its sensor interfaces 48a, 48b, including whether any sensors 22 are connected thereto, as well as whether connected sensors 22 are light-activated sensors (which provide a logic high when light from one end of the sensor is detected, e.g., an article is not blocking the photo-eye) or whether the sensors 22 are dark-activated, or PNP-type, sensors (which provide a logic high when light from one end of the sensors is not detected, e.g., an article is blocking the photo-eye), then stores that indication (block 302). In some embodiments, such as with a sensor 22 that includes its own processing capabilities, the controller 12 may be further configured to query the sensor 22 for information, including the serial number of the sensor 22, whether the sensor is an light or dark activated type sensor 22, and/or additional information about the sensor. The controller 12 is further configured to detect any motors of the motorized rollers 18 connected to the motor interfaces 46a, 46b, including any data related thereto, and store that data (block 304). In some embodiments, the controller 12 merely detects the presence of a motor connected to the motor interfaces 46a, 46b and, when a motor is detected, retrieves default information and uses that to configure the controllers 12 interaction with that motor. In specific embodiments, the default information includes an indication that the motor is a pulse roller, that the speed to operate the motor is a percentage of its maximum power rating (e.g., about 80%), the brake method to stop the motor, the acceleration rate to accelerate the motor (if any), the deceleration rate at which to decelerate the motor (if any), the mode in which to convey articles (e.g., zone singulation mode, flex zone mode, train mode, or gap train mode), the amount of time to wait before declaring a jam, and/or the amount of time to wait to run the motor after a sensor has been cleared, among others.

In any event, the controller 12 is further configured to detect any hardware connected to the hardware interfaces 49a, 49b, including any data related thereto, and store that data (block 306). The controller 12 further sets up network connections and communications with at least one additional controller 12 and/or computing systems 90 (e.g., as described above) (block 308) and configures the zones it controls as well as parameters thereof (block 310).

Figure 10:
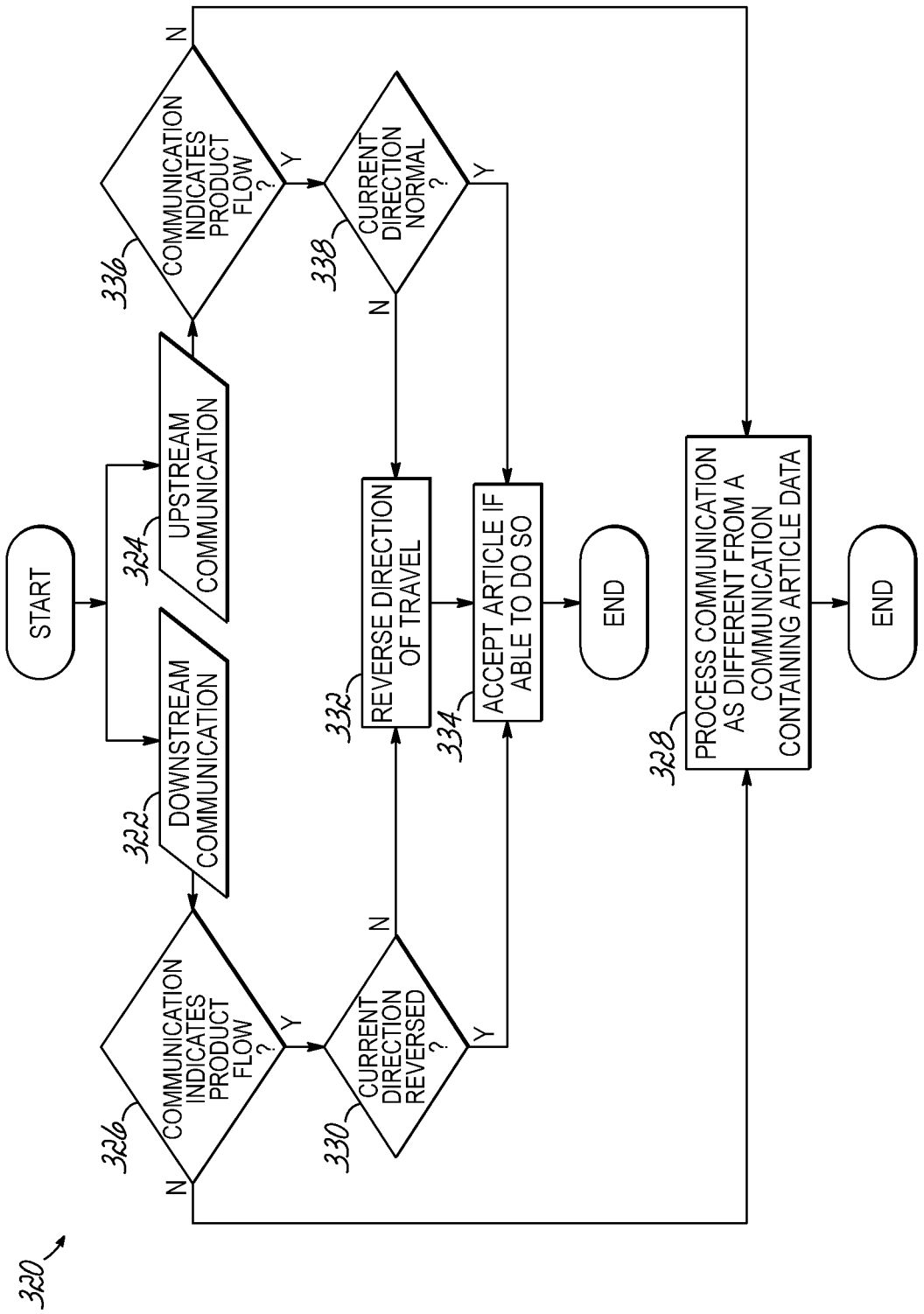
FIG. 10 is a flowchart illustrating a sequence of operations that may be performed by the controller of FIG. 1. to determine which direction to rotate and adjust its operations accordingly.

As an article is moved from a first zone managed by a first controller 12 to a second zone managed by a second controller 12, the data associated with that article is also transmitted from the first controller 12 to the second controller 12. This data can include an identification of the article, its weight, its length, and/or the state of the downward direction. With respect to the "state" data, this data is used to indicate whether direction of product flow of a conveyor assembly 14 is in the typically default direction (i.e., from the "left" of the controller 12 to the "right" of the controller 12, as described above) or whether the direction of product flow is reversed (i.e., from the "right" of the controller 12 to the "left" of the controller 12, as described above). FIG. 10 is a flowchart 320 illustrating a sequence of operations for a controller 12 to detect state data and adjust its downstream direction consistent with embodiments of the invention. In particular, the controller 12 receives a downstream communication (e.g., a communication on its second network interface 44b from a downstream controller 12 and/or computing system 90) (block 322) or receives an upstream communication (e.g., a communication on its first network interface 44a from an upstream controller 12 and/or computing system 90) (block 324). When the controller 12 receives a downstream communication, it determines whether the downstream communication includes data indicating the product flow for the article (e.g., whether the product flow is "normal" or "reversed") (block 326). When the communication does not indicate the product flow for the article ("No" branch of decision block 326), the controller 12 determines that the message is not data associated with an article and instead may be data intended for another controller 12 (such as the initial controller 12 in a linear conveyor and/or the computing system 90). As such, the controller 12 processes the communication as different from a communication containing article data (block 328).

Returning to block 326, when the communication does indicate the product flow for the article ("Yes" branch of decision block 326), the controller 12 determines whether the current direction it is transporting articles is reversed (e.g., whether previous articles have been sent in the reverse direction) (block 330). When the current direction is not reversed ("No" branch of decision block 330), the controller 12 changes its current direction of travel (e.g., such as by reversing the motors of the motorized rollers 18 it controls) (block 332) and accepts the article from the downstream controller 12 if it is able to do so (e.g., has a clear zone) (block 334). When the current direction is reversed ("Yes" branch of decision block 330), the controller accepts the article from the downstream controller 12 if it is able to do so (block 334).

Returning to block 324, when the controller 12 receives an upstream communication it determines whether the upstream communication includes data indicating the product flow for the article (block 336). When the communication does not indicate the product flow for the article ("No" branch of decision block 336), the controller 12 determines that the message is not data associated with an article and instead may be data intended for another controller 12 (such as the initial controller 12 in a linear conveyor and/or the computing system 90). As such, the controller 12 processes the communication as different from a communication containing article data (block 328).

Returning to block 336, when the communication does indicate the product flow for the article ("Yes" branch of decision block 336), the controller 12 determines whether the current direction it is transporting articles is normal (e.g., whether previous articles have been sent in the normal direction) (block 338). When the current direction is not normal ("No" branch of decision block 338), the controller 12 changes its current direction of travel (e.g., such as by reversing the motors of the motorized rollers 18 it controls) (block 332) and accepts the article from the upstream controller 12 if it is able to do so (e.g., has a clear zone) (block 334). When the current direction is normal ("Yes" branch of decision block 338), the controller accepts the article from the upstream controller 12 if it is able to do so (block 334).

When transporting an article, a controller 12 may be configured to sense the current utilized by the motor of a motorized roller 18 to detect the presence of an article being transported thereby. Advantageously, this allows a controller 12 to achieve maximum article density on a conveyor surface without constant pressure or force being applied to articles once densely accumulated, and further offers the advantage of sensor-less detection of articles. In particular, the controller 12 monitors current to motors and filters current fluctuations and spikes in order to determine when an article is being transported by a motorized roller 18. Such operation allows controllers 12 to accumulate articles and prime upstream zones to accumulate articles consistent with embodiments of the invention.

Figure 11:
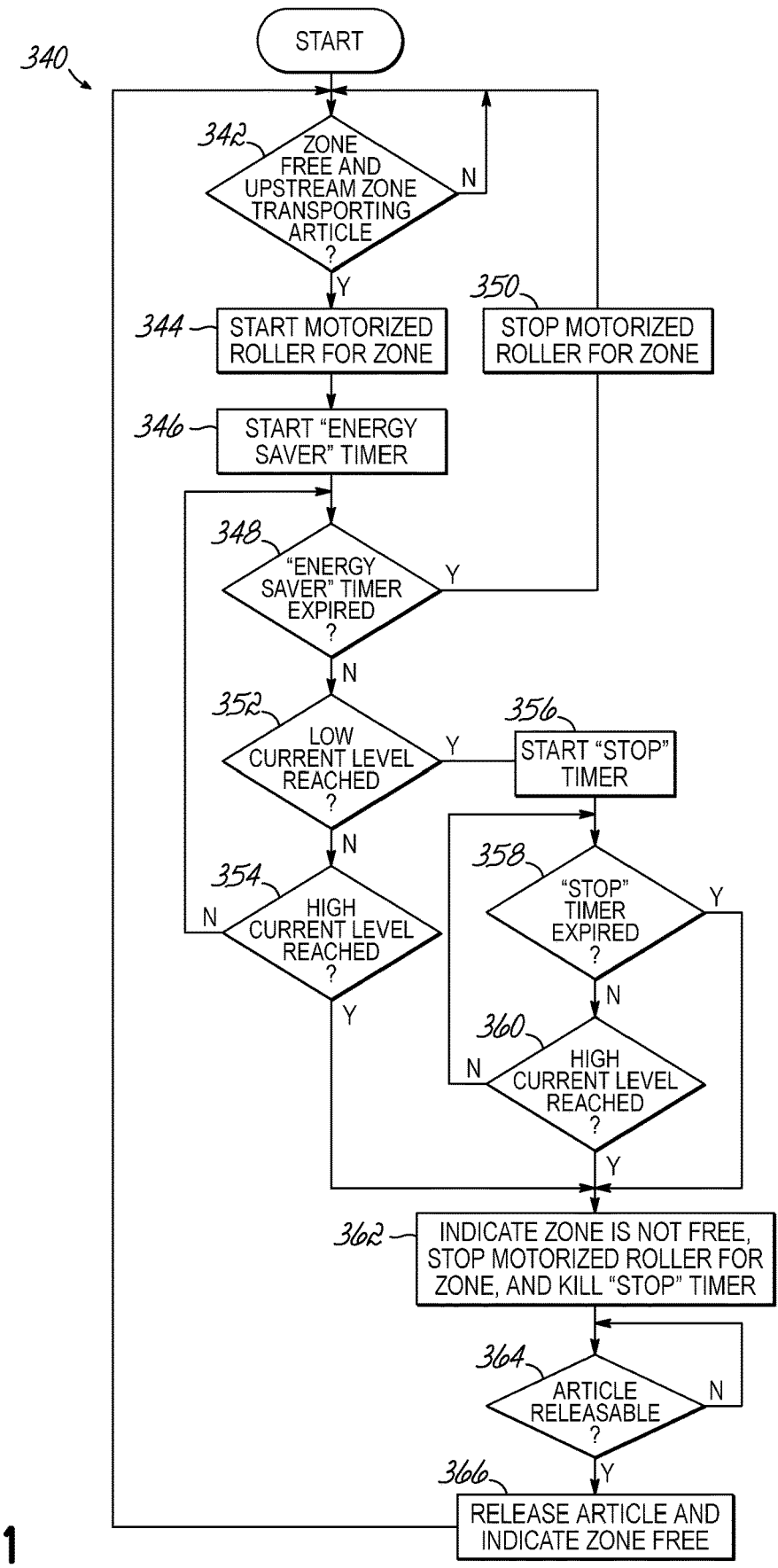
FIG. 11 is a flowchart illustrating a sequence of operations that may be performed by the controller of FIG. 1. to detect and accumulate an article being transported based on the current to a motorized roller connected thereto.

In one embodiment, the controller 12 is configured to accumulate an article by determining whether there the current to the motorized roller 18 is at a first, "low current" level, or whether the current to the motorized roller 18 is at a second, "high current" level above that low current level. The low current level corresponds to a current level at which a motorized roller 18 is operated to transport an article without impingement. The high current level corresponds to a current level at which a motorized roller 18 is operated to attempt to move an article that is jammed or otherwise impinged by another article. FIG. 11 is a flowchart 340 illustrating a sequence of operations for a controller 12 to detect and accumulate an article being transported by a motorized roller 18 by determining the current to the motorized roller 18 consistent with embodiments of the invention. The controller 12 initially determines whether it has a selected zone that is ready to accept an article from an upstream zone, as well as whether the upstream zone is transporting an article to the selected zone (block 342). When the selected zone cannot accept an article, or when the upstream zone is not transporting an article to the selected zone ("No" branch of decision block 342), the sequence of operations returns to block 342.

However, when a selected zone can accept an article and the upstream zone is transporting an article to the selected zone ("Yes" branch of decision block 342), the controller 12 starts the motorized roller 18 associated with that selected zone (block 344) as well as an "energy saver" timer (e.g., a timer after which the motorized roller 18 is stopped to save energy, and which may have a default of five seconds) (block 346), then determines whether the energy saver timer has expired (block 348). When the energy saver timer has expired ("Yes" branch of decision block 348), the motorized roller for the selected zone is stopped (block 350) and the sequence of operations returns to block 342. However, when the energy saver timer has not expired ("No" branch of decision block 348), the controller 12 detects the current used by the motorized roller and determines whether the low current level has been reached (block 352). When the low current level has not been reached ("No" branch of decision block 352), the controller 12 determines whether the high current level has been reached (block 354). When the high current level has not been reached ("No" branch of decision block 354), the sequence of operations returns back to block 348).

Returning to block 352, when the low current level has been reached, the controller 12 may determine that the motorized roller 18 is transporting an article. Thus, when the low current level has been reached ("Yes" branch of decision block 352), the controller 12 starts a "stop" timer (e.g., a timer used to accumulate an article in the selected zone, and which may have a default of about two seconds) (block 356) and determines whether the stop timer has expired (block 358). When the stop timer has not expired ("No" branch of decision block 358), the controller 12 determines whether the high current level has been reached (block 360). However, when the stop timer has expired ("Yes" branch of decision block 358) or when the high current level has been reached ("Yes" branch of decision block 360), the controller 12 indicates that the selected zone is not free, stops the motorized roller 18 for the zone, and kills the stop timer (block 362). Returning to block 360, when the high current level has not been reached ("No" branch of decision block 360), the sequence of operations may return to block 358.

After block 362, the controller determines whether the article is releasable from the selected zone (block 364). When the article cannot be released from the selected zone (e.g., because a downstream zone cannot accept the article) ("No" branch of decision block 364), the sequence of operations may return to block 364. However, when the article can be released from the selected zone (e.g., because a downstream zone can accept the article) ("Yes" branch of decision block 364), the controller may release the article (e.g., activate the motorized roller 18 to release the article to a downstream zone) (block 366) and, after releasing the article, the sequence of operations may return to block 342. In this manner, the controller 12 can determine when an article is received at a zone (e.g., when the low current level is reached but the high current level is not reached) as well as when an article is impinged or jammed (e.g., when the high current level is reached).

Advantageously, by using motor timeouts, the controller 12 also reduces pressure on the motorized roller 18, articles, and other components of the conveyor system 10, which may prevent damage thereto. Moreover, the controller 12 prevents constant running of the motorized roller 18, which can save energy and resulting in a conveying system that may be utilized in an "on-demand" fashion.

In addition to article detection, the controller 12 may be configured to detect the current to a motorized roller 18 and determine the weight and/or length of the article based, at least in part, thereon. For example, the controller 12 may be configured to determine the level of current requires to move the article with a motorized roller 18 then cross-reference the current required to move the article with a table that indicates the weight of the article. Also, for example, when the controller 12 senses that an article is being transported by a motorized roller 18, it may count the rotations of the motorized roller 18 required to transport the article across the motorized roller 18 (e.g., the amount of time that the low level current is provided to the motorized roller 18). When the circumference of the motorized roller 18 is known, the controller 12 may multiply the number of rotations required to move the article by the circumference of the motorized roller 18 to determine a length of the article. Alternatively, the controller 12 may determine the length of the article by determining the amount of time it takes to transport the article across a motorized roller 18 (e.g., the amount of time that the low level current is provided to the motorized roller 18) then multiply that time by the speed of the motorized roller 18. However, this alternative determination of length is not advantageous in situations where the speed of the motorized roller 18 is variable or situations where the article is stopped while on the motorized roller. In any event, when the length of an article is known, a controller 12 may be further configured to determine where the article is within a given zone based on the number of rotations that have been used to transport the article through the zone. Article weight and/or length information may be passed in a communication to a downstream controller 12.

Figure 12:
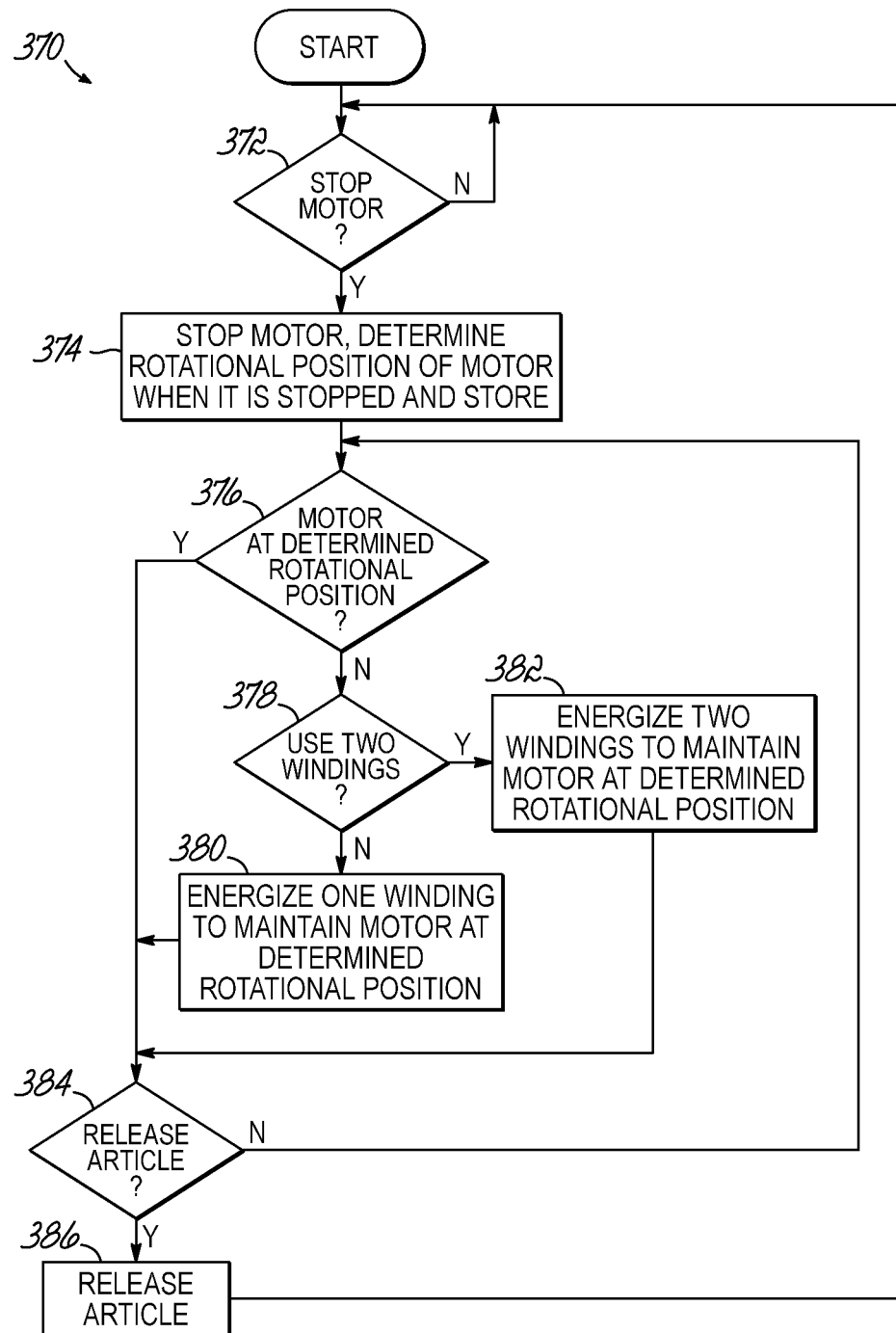
FIG. 12 is a flowchart illustrating a sequence of operations that may be performed by the controller of FIG. 1. to stop a motorized roller using a servo-lock method.

In one embodiment, the controller 12 is configured to maintain the motorized roller 18 at a particular rotational position using a servo-lock stop. FIG. 12 is a flowchart 370 illustrating a sequence of operations for the controller 12 to use a servo-lock stop consistent with embodiments of the invention. In particular, the controller 12 determines whether to stop the motor of a motorized roller 18 (block 372). When the controller 12 determines that the motor should not be stopped ("No" branch of decision block 372), the sequence of operations returns to block 372. However, when the controller 12 determines that the motor should be stopped ("Yes" branch of decision block 372), the controller 12 stops the motor (e.g., by shunting to the windings of the motor to ground or engaging a brake of the motorized roller 18, to name a few methods), determines the rotational position of the motor of the motorized roller 18 when it is stopped, and stores that data (block 374). The controller 12 then determines whether the motor is at the determined rotational position (block 376).

When the motor is not at its determined rotational position ("No" branch of decision block 376), the controller 12 determines whether it has been configured to adjust the rotational position of the motor by energizing two windings or by energizing just one winding (block 378). When the controller 12 is configured to adjust the rotational position of the motor by energizing one winding ("No" branch of decision block 378), the controller 12 energizes one winding of the motor to maintain the motor at the determined rotational position (block 380). However, when the controller 12 is configured to adjust the rotational position of the motor by energizing two windings ("Yes" branch of decision block 378), the controller 12 energizes two windings of the motor to maintain the motor at the determined rotational position (block 382).

In response to maintaining the motor at a determined rotational position (block 380 or 382), the controller 12 determines whether to release the article (e.g., whether to energize the motorized roller 18 to convey the article to a different zone) (block 384). When the controller 12 determines that it should not release the article ("No" branch of decision block 384), the sequence of operations returns to block 376. However, when the controller 12 determines that it should release the article ("Yes" branch of decision block 384) it releases the article (block 386) and the sequence of operations returns to block 372. Returning to block 376, when the controller determines that the motor is at the determined rotational position ("Yes" branch of decision block 376), the sequence of operations proceeds to block 384 and advances as described above.

Figure 13:
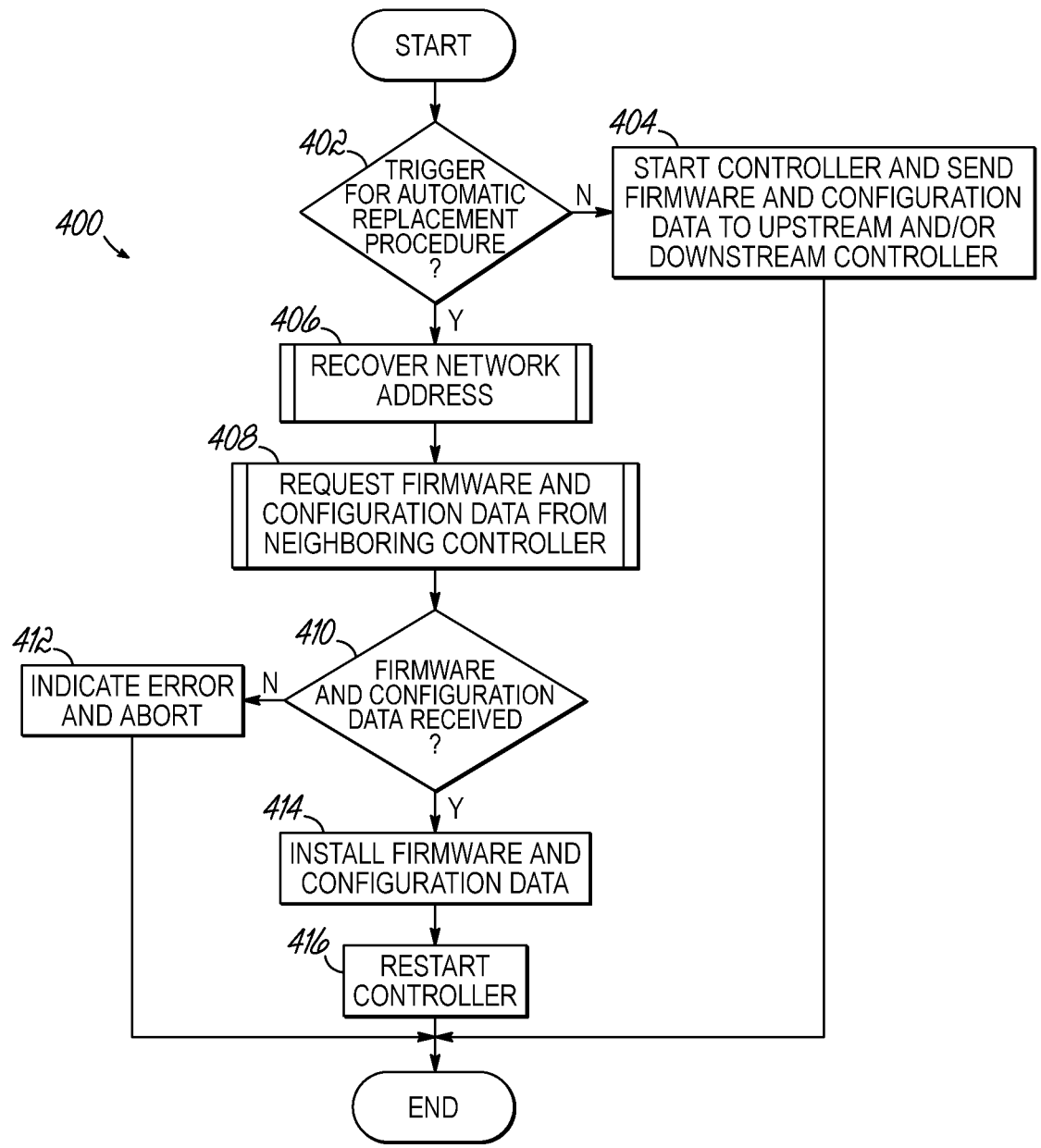
FIG. 13 is a flowchart illustrating a sequence of operations that may be performed by the controller of FIG. 1. to initiate an automatic replacement procedure.

In a conveyor system 10, one or more controllers 12 may be replaced as they experience errors, failure, or other wear. As such, a replacement controller 12 may execute an automatic replacement procedure by accessing stored configuration data of the previous controller 12 that the replacement controller 12 replaced from one or more neighboring controllers 12. FIG. 13 is a flowchart 400 illustrating a sequence of operations for an automatic replacement procedure that may be executed by a controller 12 consistent with embodiments of the invention. Initially, the controller 12 detects whether there is a trigger for an automatic replacement procedure (block 402). Specifically, the trigger to initiate an automatic replacement procedure may be a user pressing and holding a softkey of a user interface 54 before the controller 12 is turned on, then maintaining depression of the softkey of the user interface 54 as the controller 12 is turned on. In any event, when there is no trigger for an automatic replacement procedure ("No" branch of decision block 402), the controller 12 starts up and sends its firmware and configuration data to upstream and/or downstream controllers 12, if so configured (block 404), the sequence of operations may end. A controller 12 automatically stores firmware and configuration data in response to the receipt thereof, and, in specific embodiments, stores a notation of the IP address of the controller 12 from which the firmware and configuration data are sent. Thus, and as discussed in more detail below, the controller 12 can send the firmware and configuration data to the appropriate controller 12 based on the IP address of the controller that requested that firmware and configuration data.

Figure 14:
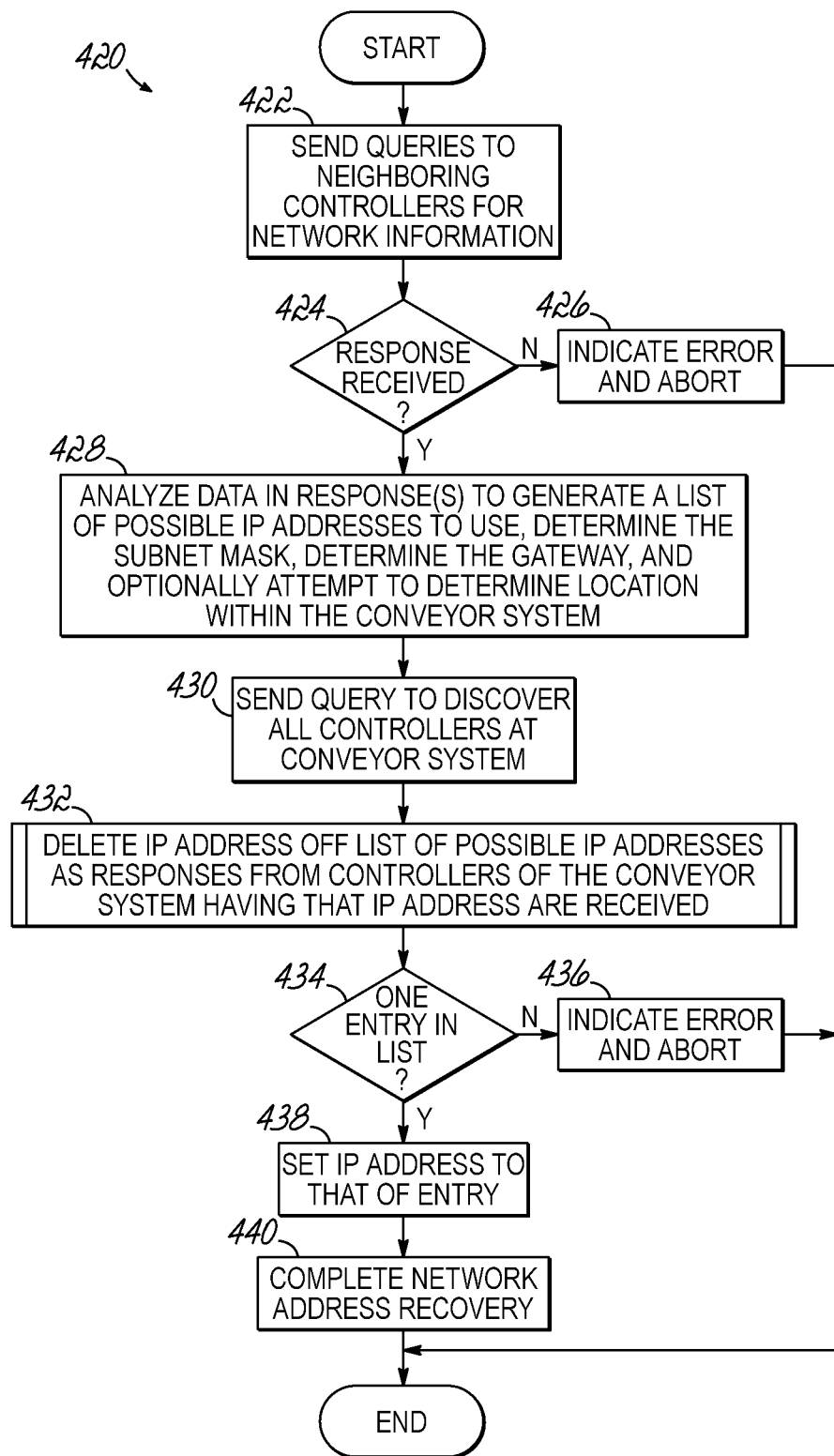
FIG. 14 is a flowchart illustrating a sequence of operations that may be performed by the controller of FIG. 1. to automatically recover a network address of a previous controller during an automatic replacement procedure.

However, when there is a trigger for an automatic replacement procedure ("Yes" branch of decision block 402), the controller 12 (which, with respect to the sequence of operations of FIGS. 13 and 14, is referred to hereinafter as the "replacement" controller 12) initiates a procedure to recover the network addresses of the controller 12 (which, with respect to the sequence of operations of FIGS. 13 and 14, is referred to hereinafter as the "previous" controller 12) that the replacement controller 12 is intended to replace (block 406). After recovering the network addresses (block 406), the replacement controller 12 requests the firmware and configuration data of the previous controller 12 that is stored on a neighboring controller 12 (block 408). Specifically, in block 408, the replacement controller 12 initially determines whether any neighboring controllers 12 are present (e.g., similarly to at least part of the sequence of operations of FIG. 5) and, if there is a neighboring controller 12 connected to the replacement controller's 12 first network interface 44a, the replacement controller 12 sends a request for the firmware and configuration data to that neighboring controller 12 through the first network interface 44a. However, and also in block 408, if there is not a neighboring controller 12 connected to the replacement controller's 12 first network interface 44a, the replacement controller 12 sends a request for the firmware and configuration data to the neighboring controller 12 connected to the second network interface 44b.

After requesting the firmware and configuration data from a neighboring controller 12 (block 408), the replacement controller 12 determines whether it has received the firmware and configuration data (block 410). When the firmware and configuration data have not been received ("No" branch of decision block 410), the replacement controller 12 indicates an error and aborts the automatic replacement procedure (block 412). However, when the firmware and configuration data have been received ("Yes" branch of decision block 410), the replacement controller installs the firmware and configuration data (block 414) and restarts itself (block 416).

As discussed above, the replacement controller 12 may recover the network addresses of the previous controller 12 in block 406 of FIG. 13. In general, even if not automatically configured in an automatic configuration procedure, the controllers 12 of a conveyor system 10 are programmed to have consecutive IP addresses that increase by a predetermined amount (e.g., one) along the downstream direction 26. As such, a replacement controller 12 may recover its IP address (as well as other network addresses) by determining the network addresses of additional controllers 12 of the conveyor system 10 and comparing those network addresses to potential network addresses.

FIG. 14 is a flowchart 420 illustrating a sequence of operations for a replacement controller 12 to recover the network address of the previous controller 12, and particular a sequence of operations to perform at block 406 in FIG. 13, consistent with embodiments of the invention. In particular, the replacement controller 12 sends one or more queries through its network interfaces 44a, 44b to neighboring controllers 12 for network information, including their IP addresses, the subnet mask, the gateway, and data indicating whether a neighboring controller 12 is the beginning or ending controller 12 within a particular subnet (block 422). Specifically, the replacement controller 12 sends one query through each network interface 44a, 44b. The replacement controller 12 then determines whether any responses were received (block 424). When at least one response is not received ("No" branch of decision block 424), the replacement controller 12 indicates and error and aborts the automatic replacement procedure (block 426).

When at least one response is received ("Yes" branch of decision block 424), the replacement controller 12 analyzes the data therein to generate a list of possible IP addresses to use, determines the subnet mask, determines the gateway, and, optionally, attempts to determine its location along the conveyor system 10 (block 428). In one example, when connected to two neighboring controllers 12, the replacement controller 12 may generate the list of possible IP addresses such that it has one entry set to the IP address between those of the neighboring controllers 12. Also for example, when connected to one neighboring controller 12, the replacement controller 12 may generate the list of possible IP addresses such that it has one entry set to the IP address above the neighboring controller 12 and one IP address below the neighboring controller 12.

After the replacement controller 12 has generated the list of possible IP addresses, it sends a query to discover one or more controllers 12 of the conveyor system 10 (block 430) and, as it receives responses from the one or more controllers 12 (e.g., including any neighboring controllers 12), it deletes the IP addresses from the list of possible IP addresses when messages from the one or more controllers 12 have a corresponding IP address that matches (block 432). In a specific example, when the replacement controller 12 is the initial controller 12 of a conveyor system 10 and connected to one neighboring controller 12, a downstream controller 12 will be configured with the IP address above that of the neighboring controller 12 such that the corresponding entry is removed from the list of possible IP addresses, leaving only the IP address below that of the neighboring controller 12. Correspondingly, when the replacement controller 12 is the last controller 12 of a conveyor system 10 and connected to one neighboring controller 12, a downstream controller 12 will be configured with the IP address below that of the neighboring controller such that the corresponding entry is removed from the list of possible IP addresses, leaving only the IP address above that of the neighboring controller 12.

In any event, and in response to filtering out already used IP addresses (block 432), the replacement controller 12 determines whether there is only one entry in the list of possible IP addresses (block 434). More than one entry in the list of possible IP addresses may indicate that there is more another missing controller 12, which could result in the replacement controller 12 picking an unused IP address. This, in turn, may cause communication confusion between the controllers 12 of the conveyor system 10 in which one or more of those controllers attempt to send a message to the replacement controller 12 at an IP address that the replacement controller 12 is not using. Thus, when there is more than one entry in the list of possible IP addresses ("No" branch of decision block 434), the replacement controller indicates an error and aborts the automatic replacement procedure (block 436). However, when there is one entry in the list of possible IP addresses ("Yes" branch of decision block 434), the replacement controller sets its IP address to the IP address of that entry (block 438) and completes network address recovery by setting its subnet mask to that of neighboring controllers 12, setting its gateway to that of neighboring controllers 12, and deleting the list of possible IP addresses, among other tasks (block 440).

Figure 15:
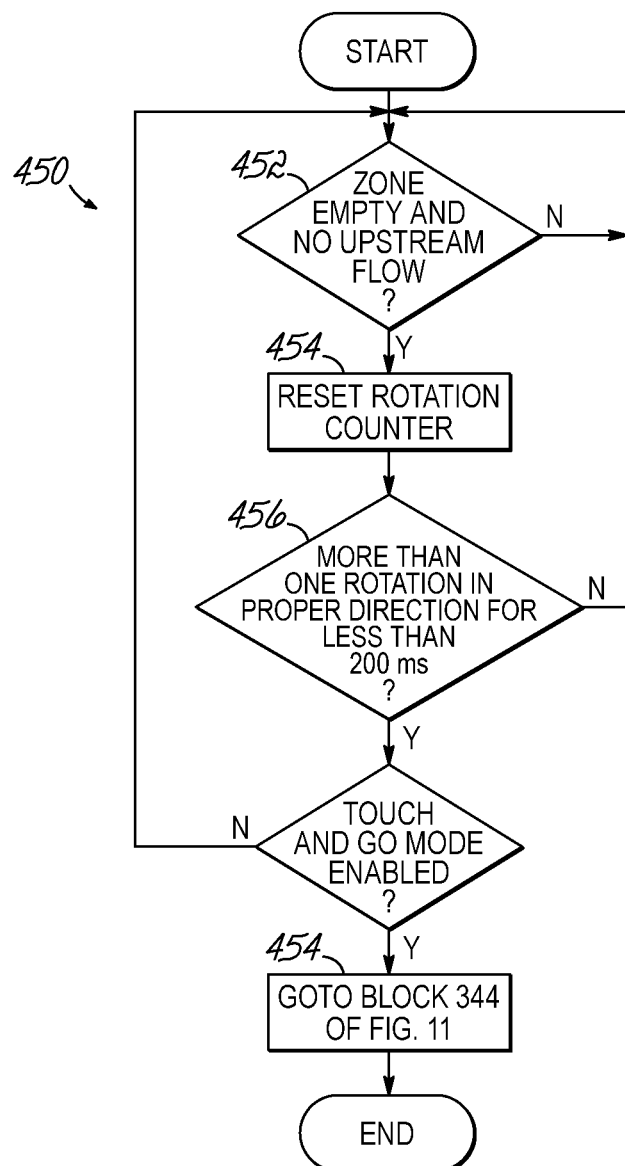
FIG. 15 is a flowchart illustrating a sequence of operations that may be performed by the controller of FIG. 1. to operate in a "touch-and-go" mode.

Controllers 12 may be configured to convey articles across the conveyor system 10 in a number of ways, including, as discussed above, a zone singulation mode, a flex zone mode, a train mode, a gap train mode, a touch-and-go mode, and a look-ahead-slow-down mode. More specifically, the touch-and-go mode allows a user to selectively activate a conveyor system 10, which may be advantageous in facilities where leaving conveyor systems 10 constantly running (e.g., leaving motorized rollers 18 constantly turning) is inefficient, unwanted, or unnecessary. As such, a controller 12 may detect the rotation of a previously static motorized roller 18 then start at least one motorized roller 18 of at least one downstream controller 12 in response thereto. FIG. 15 is a flowchart 450 illustrating a sequence of operations for a controller 12 in a touch-and-go mode to implement functionality corresponding to that described above consistent with embodiments of the invention. In particular, the controller 12 initially determines whether a zone it is controlling is free and whether there is an article being transported upstream (block 452). When the zone is not free or when an article is being transported upstream ("No" branch of decision block 452), the controller 12 continues its current operation (e.g., running motorized rollers 18 and waiting to accept the upstream article, keeping motorized rollers 18 static and waiting to unload an article, or running motorized rollers 18 to unload an article) ("Yes" branch of decision block 452), the controller resets a rotation counter (block 454) and determines whether there is more than one rotation (e.g., such as one-and-a-half rotations or two rotations) in the proper direction (e.g., in the downstream direction 26) that lasts for less than two-hundred milliseconds (block 456).

When there is not more than one rotation in the proper direction that lasts for less than two-hundred milliseconds ("No" branch of decision block 456), the sequence of operations proceeds back to block 452. However, when there is more than one rotation in the proper direction that lasts for less than two-hundred milliseconds ("Yes" branch of decision block 456), the controller 12 determines whether the touch-and-go mode is enabled (block 458). When the touch-and-go mode is not enabled ("No" branch of decision block 458), the sequence of operations proceeds back to block 452. However, when the touch-and-go mode is enabled ("Yes" branch of decision block 458), the controller 12 proceeds to block 344 of FIG. 11 (block 460).

Figure 16:
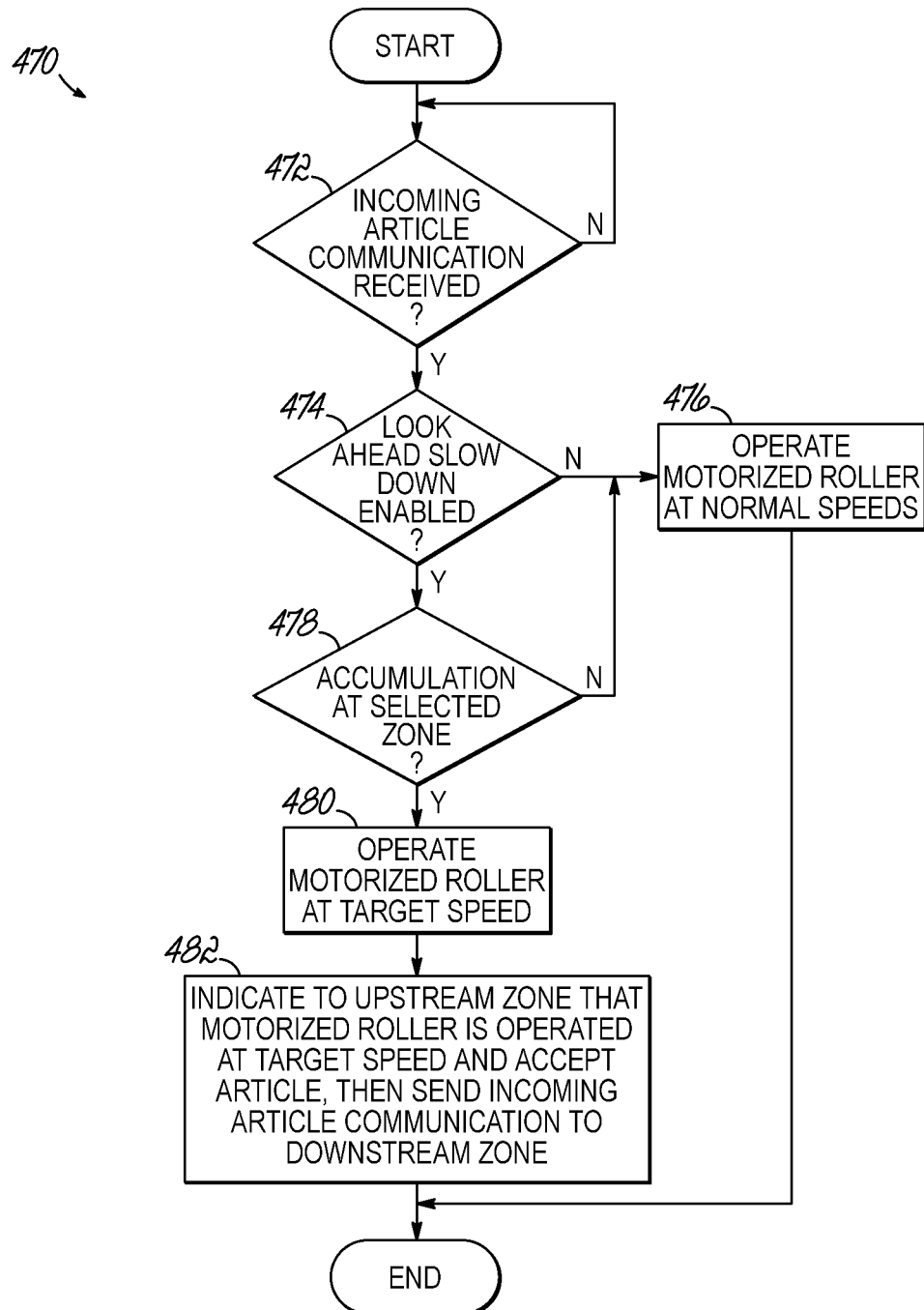
FIG. 16 is a flowchart illustrating a sequence of operations that may be performed by the controller of FIG. 1. to operate in a "look-ahead-slow-down" mode.

When transporting an article, controllers 12 may also be configured to constantly look ahead to the next downstream zone and dynamically adjust the motors of the motorized rollers to a user configurable speed to allow the article to come to a controlled stop. FIG. 16 is a flowchart 470 illustrating a sequence of operations for a controller 12 in a look-ahead-slow-down mode to implement functionality corresponding to that described above consistent with embodiments of the invention. In particular, the controller 12 determines whether it has received an incoming article communication for a selected zone controlled thereby (e.g., a message indicating that an article is being transported to a zone controlled by the controller 12) (block 472). When the controller has not received an incoming article communication ("No" branch of decision block 472), the sequence of operations returns to block 472. However, when the controller receives an incoming article communication ("Yes" branch of decision block 472), it determines whether the look-ahead-slow-down mode is enabled (block 474).

When the look-ahead-slow-down mode is not enabled ("No" branch of decision block 474), the controller 12 operates the motorized roller 18 for the selected zone at its normal speeds (e.g., the normal starting and stopping speed) (block 476). However, when the look-ahead-slow-down mode is enabled ("Yes" branch of decision block 474), the controller 12 determines whether the controller 12 is accumulating articles at the selected zone (block 478). For example, the controller 12 for the selected zone may adjust the speed of a motorized roller 18 for that selected zone to a target speed that is lower than the normal speed for the motorized roller 18 when it is accumulating an article. Advantageously, this slows the article. As such, when the controller 12 is not accumulating articles in the selected zone ("No" branch of decision block 478), the controller 12 operates the motorized roller 18 for the selected zone at its normal speeds (block 476). When the controller 12 is accumulating articles at the selected zone ("Yes" branch of decision block 478), the controller 12 operates the motorized roller at a target speed (block 480), which may be from about 20% to about 80% of the normal speed, and in specific embodiments is predefined by the user. In any event, the controller 12 sends a communication to at least one upstream controller 12 that the motorized roller 18 is being operated at the target speed (referred to hereinafter as a "target speed communication") and accepts the article, then sends an incoming article communication to controller 12 controlling the next downstream zone (or, when the controller 12 controlling the next downstream zone is the controller 12 controlling the selected zone, merely stores such an indication) (block 482).

Figure 17:
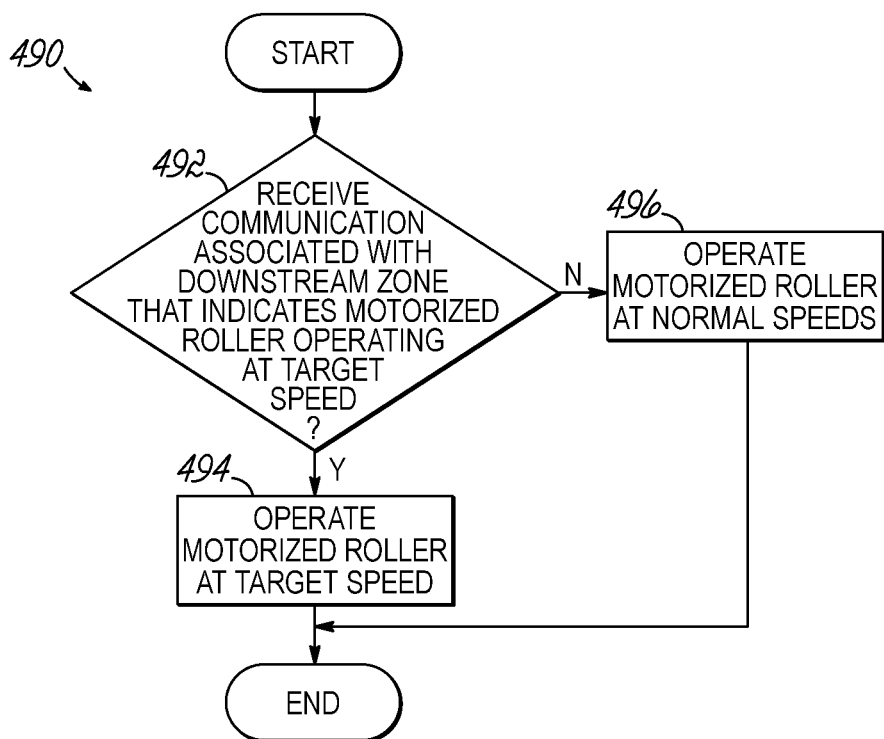
FIG. 17 is a flowchart illustrating a sequence of operations that may be performed by the controller of FIG. 1. to determine whether a downstream zone is being operated at a target speed.

FIG. 17 is a flowchart 490 illustrating a sequence of operations for a controller 12 to receive a communication that at least one downstream zone includes a motorized roller 18 being operated at the target speed consistent with embodiments of the invention. In particular, the upstream controller 12 determines whether it has received a communication associated with a downstream zone that indicates that the motorized roller 18 of the downstream zone is being operated at the target speed (block 492). When the controller 12 receives such a communication ("Yes" branch of decision block 492), the controller 12 operates the motorized roller 18 of the zone at the target speed (block 494). Alternatively, when the controller has not received a communication indicating that the motorized roller of a downstream zone is being operated at the target speed ("No" branch of decision block 492), the controller operates the motorized roller 18 of the zone at its normal speeds.

Figure 18:
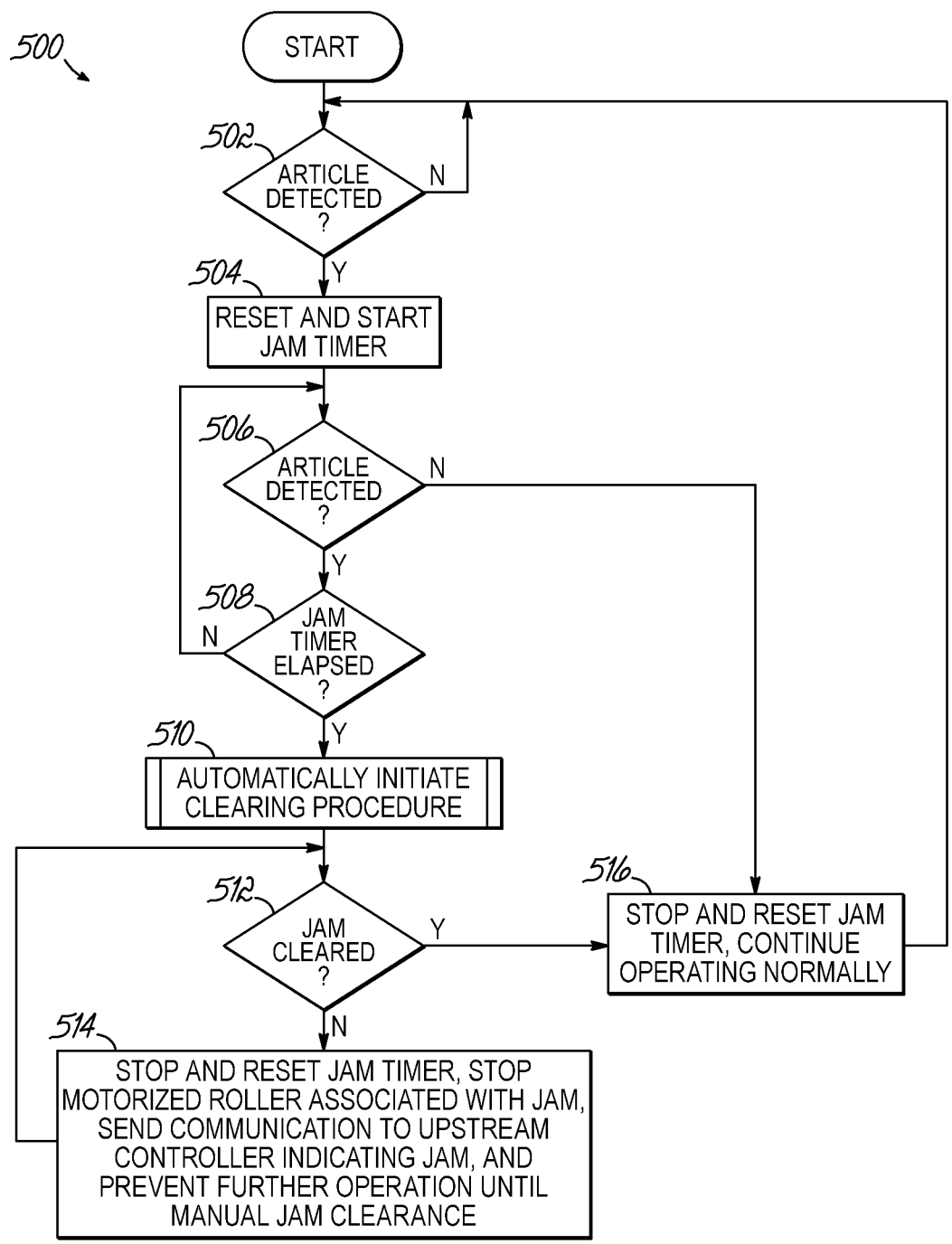
FIG. 18 is a flowchart illustrating a sequence of operations that may be performed by the controller of FIG. 1. to initiate a jam clearing procedure.

An article may become jammed as it is conveyed along a conveyor system 10. The controllers 12, however, may automatically initiate a jam clearing procedure to resolve such jams. FIG. 18 is a flowchart 500 illustrating a sequence of operations for a controller 12 to initiate such a jam clearing procedure consistent with embodiments of the invention. The controller 12 initially determines whether a sensor 22 associated with a selected zone detects an article (bock 502). When the sensor 22 does not detect an article ("No" branch of decision block 502), the sequence of operations returns to block 502. However, when the sensor 22 detects that an article is present ("Yes" branch of decision block 502), the controller 12 resets and starts a jam timer (e.g., resetting the jam timer to about five seconds) (block 504) and again determines whether the sensor 22 detects an article (block 506). When, at block 506, the controller determines that the article is still present ("Yes" branch of decision block 506), the controller 12 determines whether the jam timer has elapsed (block 508).

When the jam timer has not elapsed ("No" branch of decision block 508), the sequence of operations returns to block 506. However, when the jam timer has elapsed ("Yes" branch of decision block 508), the controller 510 automatically initiates a jam clearing procedure (block 510). When the jam clearing procedure has finished, the controller 12 then determines whether the jam has been cleared (e.g., whether the article is no longer detected) (block 512). When the jam has not been cleared by the jam clearing procedure ("No" branch of decision block 512), the controller 12 stops and resets the jam timer, stops the motorized rollers 18 associated with the zone in which that jam has occurred, sends a communication to at least one upstream controller 12 (if any) that indicates that a jam has occurred, and prevents further operation until the jam has been manually cleared (block 514). The sequence of operations proceeds from block 514 back to block 512. Returning to block 506, when an article is not still present ("No" branch of decision block 506), or, with respect to block 512, when a jam has been cleared by the jam clearing procedure ("Yes" branch of decision block 512), the controller 12 stops and resets the jam timer, then continues operating in a normal fashion (block 516).

Figure 19:
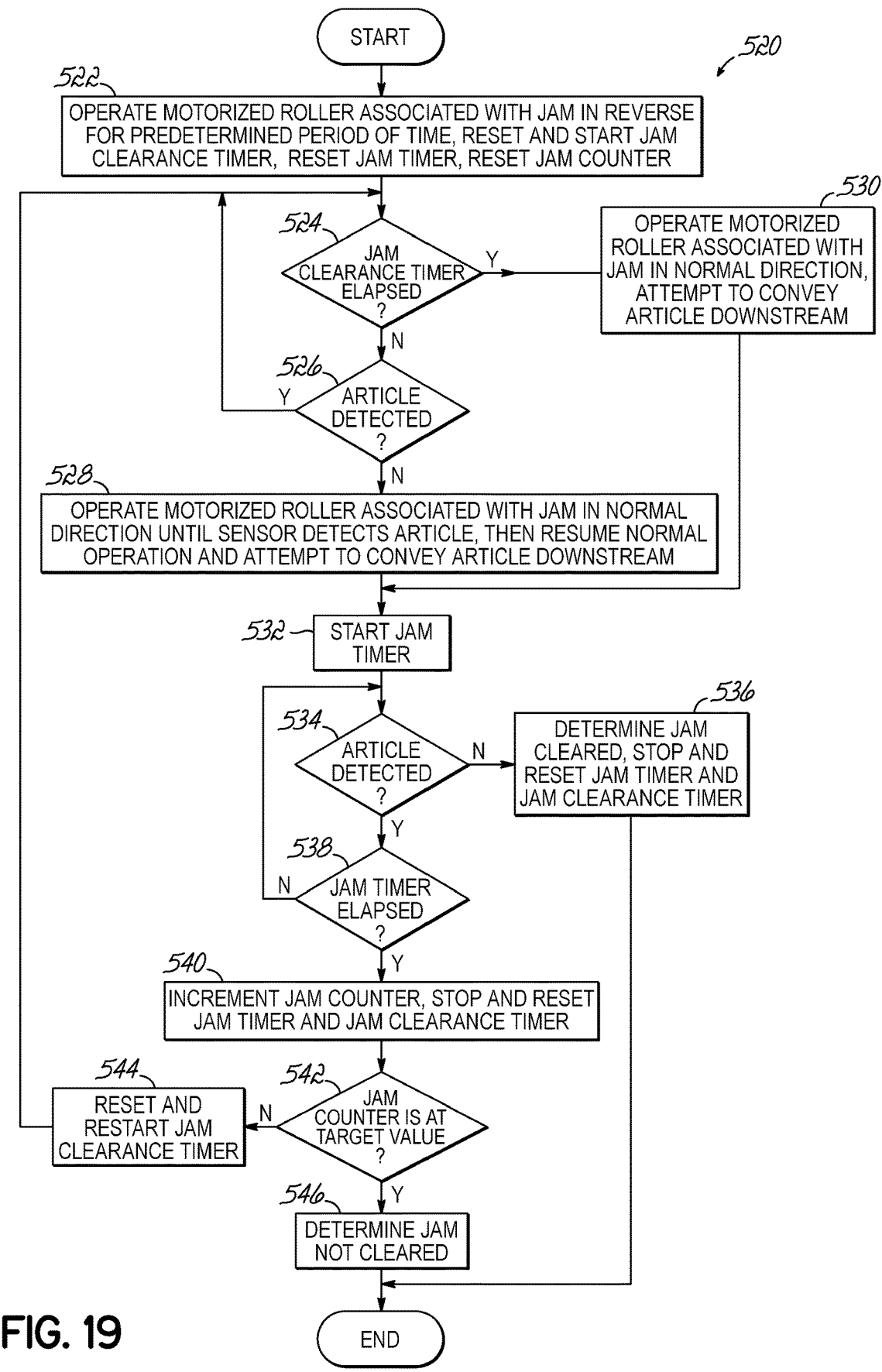
FIG. 19 is a flowchart illustrating a sequence of operations that may be performed by the controller of FIG. 1. to clear a jam.

FIG. 19 is a flowchart 520 illustrating a jam clearing procedure that may be performed at block 510 in flowchart 500 of FIG. 18 by a controller 12 consistent with embodiments of the invention. Returning to FIG. 19, the controller 12 operates the motorized roller 18 associated with the zone that may have a jam in reverse, resets and starts a jam clearance timer (e.g., resetting the jam clearance timer to about five seconds), resets the jam timer, and resets a jam counter (e.g., resetting the jam counter to zero) (block 522) and determining whether the jam clearance timer has expired (block 524). When the jam clearance timer has not elapsed ("No" branch of decision block 524), the controller 12 determines whether the sensor 22 associated with the selected zone detects an article (block 526). When the sensor 22 detects the article ("Yes" branch of decision block 526), the sequence of operations returns to block 524. However, when the sensor 22 does not detect the article ("No" branch of decision block 526), the controller 12 operates the motorized roller 18 associated with the jam in the normal direction until the sensor 22 detects the article, then resumes normal operation and attempts to convey the article downstream (block 528). Returning to block 524, when the jam clearance timer has expired ("Yes" branch of decision block 524), the controller 12 operates the motorized roller 18 associated with the jam in the normal direction and attempts to convey the article downstream (block 530).

In response to the actions at block 528 or block 530, the controller starts the jam timer (block 532) and again determines whether the sensor 22 detects the article (block 534). When the sensor 22 does not detect the article ("No" branch of decision block 534), the controller determines that the jam has been cleared, and stops and resets the jam timer and the jam clearance timer (block 536). When the sensor 22 detects the article ("Yes" branch of decision block 534), the controller 12 determines whether the jam timer has elapsed (block 538). When the jam timer has not elapsed ("No" branch of decision block 538), the sequence of operations returns to block 534. When the jam timer has elapsed ("Yes" branch of decision block 534), the controller 12 increments the jam counter (e.g., such as by one), and stops and resets the jam timer and the jam clearance timer (block 540). The controller 12 then determines whether the jam counter has reached a target value (e.g., about three) (block 542). When the jam counter has not reached a target value ("No" branch of decision block 542), the controller restarts the jam clearance timer (block 544) and the sequence of operations returns to block 524. However, when the jam counter has reached the target value ("Yes" branch of decision block 542), the controller determines that the jam has not been cleared (block 546). In response to the actions at block 536 or block 546, the controller may proceed to block 512 of the flowchart 500 of FIG. 18.

At times, a particular motorized roller 18 may be experience a tangential mechanical force such that the maximum rotational speed therefor is exceeded. The motor in the motorized roller 18 thus generates excess electrical energy that is fed back to a corresponding controller 12. The controller 12, in turn, may absorb the energy and dissipate it as heat within the motor interface(s) 46a, 46b thereof. This prevents high voltage from being provided to other, more sensitive circuitry of the controller 12. Alternatively, the controller 12 may actively divert the excess electrical energy to the power supply unit 24 connected thereto, thus reducing the overall load thereon.

Figure 20:
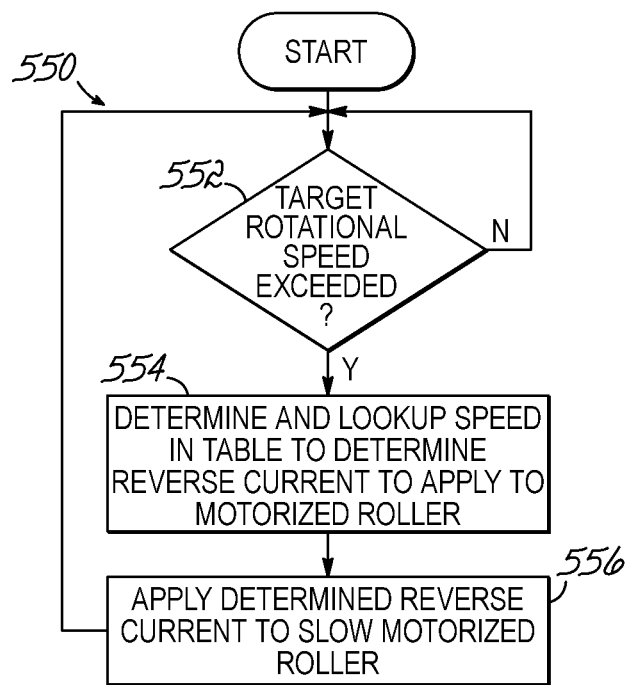
FIG. 20 is a flowchart illustrating a sequence of operations that may be performed by the controller of FIG. 1. to reduce the rotational speed of a motorized roller.

However, neither method of dealing with excess electrical energy in turn alleviates the problem of the maximum rotational speed of a motorized roller 18 being exceeded. Thus, in some embodiments, the controller 12 is configured to slow down the motor of a motorized roller 18 by providing an opposing current to the windings of the motor to, in turn, induce an opposing motor torque to reduce the speed of the motorized roller 18. FIG. 20 is a flowchart 550 illustrating a sequence of operations for a controller 12 to reduce the rotational speed of a motorized roller 18 consistent with embodiments of the invention. In particular, the controller 12 determines whether the target rotational speed of a motorized roller 18 has been exceeded (block 552). When the target rotational speed of the motorized roller 18 has not been exceeded ("No" branch of decision block 552), the sequence of operations returns to block 552. However, when the target rotational speed of the motorized roller 18 has been exceeded ("Yes" branch of decision block 552), the controller 12 determines the speed and looks up the speed in a table to determine a reverse current to apply to the motorized roller 18 to slow the motorized roller 18 (block 554) and applies that determined reverse current to the motorized roller 18 to slow that motorized roller 18 (block 556). The sequence of operations may then return to block 552.

In general, brushless DC motors that may be used in motorized rollers 18 consistent with embodiments of the invention may generate power when they are rotated from an external force, such as a when a conveyor surface they control is angled downwardly and an article rolls the motorized roller 18 as it traverses that surface. Some embodiments of the invention apply a current to the motorized roller 18 to prevent it from turning, as discussed above. However, alternative embodiments of the invention may supply the power generated by the motorized roller to the power supply unit 24. This, in turn, may reduce the overall power consumption of the conveyor system 10.

Figure 21:
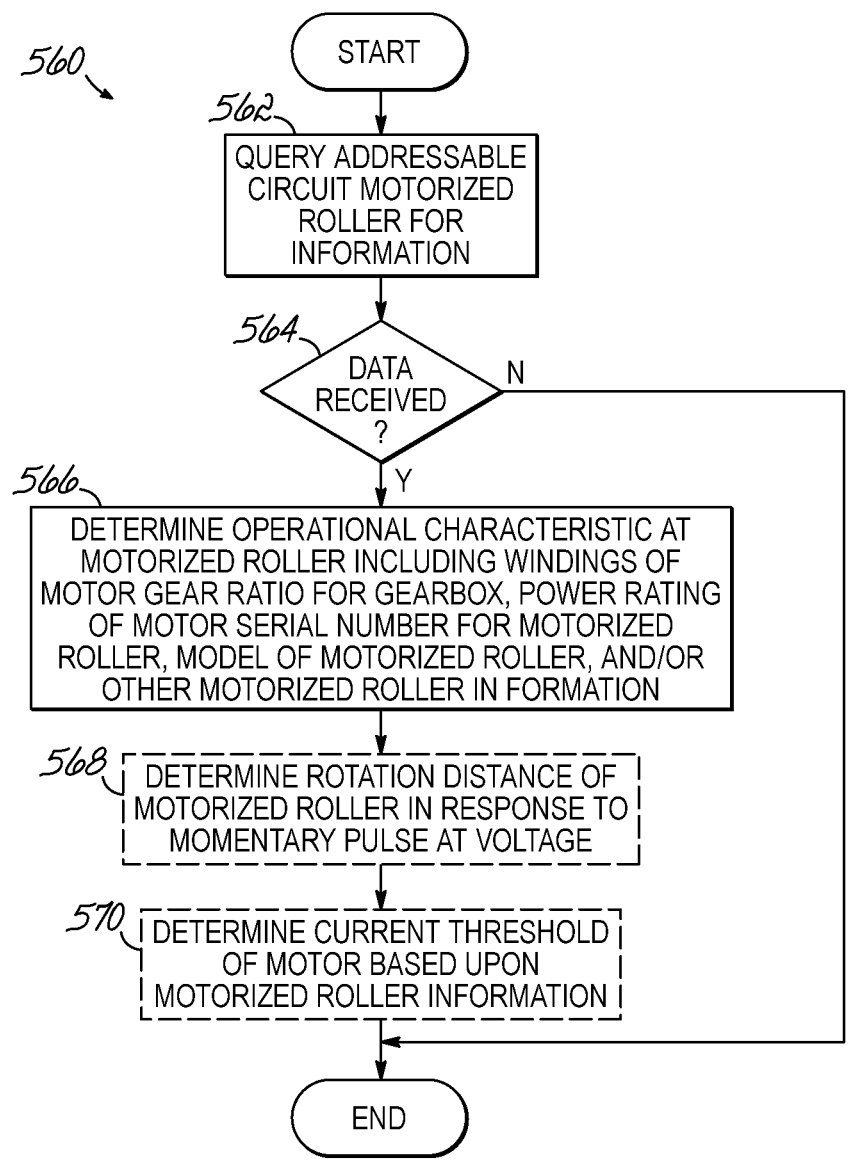
FIG. 21 is a flowchart illustrating a sequence of operations that may be performed by the controller of FIG. 1 to determine an operational characteristic of a motorized roller and, optionally, control that motorized roller based upon that operational characteristic.

In some embodiments, and as discussed above, a motorized roller 18 may include an addressable circuit 110 having information stored thereon. The controller 12, in turn, may be configured to retrieve that information, determine an operational characteristic of the motorized roller 18, and/or control the motorized roller 18 based upon that operational characteristic. FIG. 21 is a flowchart 560 illustrating a sequence of operations for a controller 12 to determine an operational characteristic of a motorized roller 18 and, optionally, control that motorized roller 18 based upon that operational characteristic consistent with embodiments of the invention. In particular, the controller 12 may be configured to communicate with an addressable circuit 110 of the motorized roller 18 and query the addressable circuit 110 for information associated with the motorized roller 18 (block 562). When data is received from the addressable circuit 110 ("Yes" branch of decision block 564), the controller 12 determines at least one operational characteristic of the motorized roller 18, such as the number of windings of the motor of the motorized roller 18, the circumference of the housing of the motorized roller 18, the radius of the motorized roller 18, the gear ratio for the gear box of the motorized roller 18, the power rating of the motor of the motorized roller 18, the serial number for the motorized roller 18, the model of the motorized roller 18, and/or other motorized roller 18 information (block 566). The controller 12 may then determine information about the operation of the motorized roller 18 and/or control the motorized roller 18 appropriately.

In an optional block, the controller 12 determines the rotational distance of the motorized roller 18 in response to a momentary pulse of voltage (block 568). For example, the rotation of a motor of the motorized roller 18 in response to a momentary pulse of voltage is typically from one winding to the next. When the motor includes three windings, the motor operates to rotate by one-third. This, in turn, is translated by the gearbox into a percentage of rotation of the housing of the motorized roller 18. Continuing the example, if the gearbox ratio of a gearbox of the motorized roller 18 is 60-1, then sixty rotations of the motor translate into one rotation of the motorized roller 18. As such, one-third rotation of the motor translates to $1/180^{th}$ rotation of the housing of the motorized roller. Thus, if the housing of the motorized roller 18 has a circumference of twelve inches, the controller 12 with the data above, some of which may be received from the addressable circuit of the motorized roller 18, may calculate that the rotational distance of the housing of the motorized roller 18 in response to a momentary pulse of voltage to the motor of the motorized roller 18 is approximately $2/30^{th}$ of an inch in block 566.

In another optional block, the controller 12 determines the current threshold of the motor of the motorized roller 18 based information associated with the motorized roller 18 (block 570). For example, the motorized roller 18 may be rated for a particular current level. Exceeding that current level may result in damage to a component of the motorized roller. Continuing with the example, the controller 12 may receive information associated with the motorized roller 18 that indicates the power rating of the motor of the motorized roller 18 (e.g., how many watts the motor is rated for) or the model of the motorized roller 18. As such, the controller 12 may access the configuration data structure 62 or parameters data structure 64, and particularly a lookup table thereof, to determine, for the power rating or model, the current limit for the motor of the motorized roller 18 in block 570.

When data is not received from a motorized roller 18 ("No" branch of decision block 564), or in response to completing operations in blocks 568 or 570, the sequence of operations may end.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In particular, one having ordinary skill in the art will appreciate that any of the blocks in the above flowcharts may be reorganized, deleted, or made concurrent with any other block of the above flowcharts. Accordingly, departures may be made from such details without departing from the spirit or scope of applicants' general inventive concept. Thus, the invention lies in the claims hereinafter appended.

What is claimed is:

1. A conveyor controller for being implemented into a conveyor system having at least one motorized roller in at least a portion of the conveyor system, the conveyor controller comprising:
control circuitry:
at least one network interface for interfacing with at least one additional conveyor controller;
the control circuitry configured for monitoring a stationary motorized roller for detecting at least partial rotation of the motorized roller;
in response to detecting the at least partial rotation of the previously stationary motorized roller, the control circuitry further configured for determining a length of time during which the at least partial rotation has been detected;
in response to the determined length of time exceeding a first target period of time, the control circuitry activating the motorized roller to rotate.

2. The conveyor controller of claim 1, wherein the control circuitry is further configured, when activating the motorized roller, to communicate information with the at least one additional conveyor controller regarding the activation of the motorized roller.

3. The conveyor controller of claim 1 wherein the motorized roller is configured for transmitting a message to the conveyor controller indicating that the motorized roller has been activated.

4. The conveyor controller of claim 1, wherein the control circuitry is further configured for supplying a voltage signal to the motorized roller for activating the motorized roller.

5. The conveyor controller of claim 1, wherein the control circuitry is further configured, when the determined length of time exceeds a first target time, to evaluate the mode of operation of the control circuitry before activating the motorized roller to rotate.

6. The conveyor controller of claim 1, wherein the control circuitry is further configured for deactivating the motorized roller after a second target period of time has expired.

7. The conveyor controller of claim 1, wherein the control circuitry is further configured for determining the direction of the at least partial rotation of the roller and activating the motorized roller to rotate if the determined direction is a proper direction.

8. The conveyor controller of claim 1, wherein the control circuitry is further configured for receiving a message in the conveyor controller from an additional conveyor controller downstream of the first conveyor controller that indicates that there is a jam in the conveyor system and for deactivating the motorized roller.

9. The conveyor controller of claim 1, wherein the control circuitry activates the motorized roller to rotate by gradually increasing a rate of rotation of the motorized roller.

10. The conveyor controller of claim 6, wherein the control circuitry deactivates the motorized roller by gradually reducing a rate of rotation of the motorized roller.

11. A conveyor controller for being implemented into a conveyor system having at least one motorized roller in at least a portion of the conveyor system, the conveyor controller comprising:
control circuitry;
at least one network interface for interfacing with at least one additional conveyor controller;
the control circuitry configured for querying the at least one motorized roller for obtaining data identifying at least one operational characteristic of the motorized roller;
the control circuitry further configured for analyzing the obtained data and determining at least one non-transitory operational characteristic of the at least one motorized roller and for controlling the motorized roller within at least a portion of the conveyor system based at least in part upon the determined non-transitory operational characteristic of the motorized roller.

12. The conveyor controller of claim 11, wherein the at least one motorized roller includes an addressable circuit and the control circuitry is configured for communicating with the addressable circuit for querying the at least one motorized roller to obtain data identifying an operational characteristic of the motorized roller.

13. The conveyor controller of claim 11, wherein the at least one non-transitory operational characteristic includes a gear ratio of a gear box of the motorized roller, the control circuitry further configured for determining, based on the gear ratio, a distance the motorized roller rotates in response to a voltage signal.

14. The conveyor controller of claim 13, wherein the voltage signal is a momentary voltage signal.

15. The conveyor controller of claim 11, wherein the at least one non-transitory operational characteristic includes a power rating of a motor of the motorized roller, the control circuitry further configured for determining, based on the power rating, a current threshold associated with the motorized roller that indicates a level of current above which the motorized roller should not be operated.

16. The conveyor controller of claim 11, wherein the at least one non-transitory operational characteristic includes at least one of: a number of windings of a motor of the motorized roller, the radius of the motorized roller, the gear ratio of a gear box of the motorized roller, the power rating of a motor of the motorized roller, the serial number for the motorized roller, and the model of the motorized roller.

17. A conveyor controller for being implemented into a conveyor system having at least one motorized roller in at least a portion of the conveyor system, the conveyor controller comprising:
control circuitry:
at least one network interface for interfacing with at least one additional conveyor controller;
the control circuitry configured for supplying a voltage signal to the at least one motorized roller for activating the motorized roller, the control circuitry determining whether a current level of the voltage signal for the activated motorized roller is associated with a low level for indicating that the motorized roller is conveying a first article;
in response to determining that the motorized roller is conveying the first article, the control circuitry further determining whether the current level for the motorized roller is associated with a high level to indicate that the first article has jammed or encountered a second article; and
the control circuitry further configured, in response to determining that the first article has jammed or encountered a second article, for controlling the at least a portion of the conveyor to convey the first and second articles simultaneously and without a substantial gap therebetween during such conveyance.

18. The conveyor controller of claim 17 wherein the control circuitry is further configured for:
maintaining a timer for the activated motorized roller;
deactivating the motorized roller after a target period of time has elapsed for the timer during which a current level of the voltage signal has not reached the low level and during which the current level of the voltage signal has also not reached the high level.

19. The conveyor controller of claim 17 wherein the control circuitry is further configured for:
in response to determining that the motorized roller is conveying the first article, maintaining a timer for the activated motorized roller;
deactivating the motorized roller after a target period of time has elapsed for the timer when conveying the first article.

20. The conveyor controller of claim 19, further comprising:
monitoring the elapsed time for the timer for the activated motorized roller, and deactivating the motorized roller when a current level of the voltage signal reaches the high target level before the target period of time has elapsed.

* * * * *